United States Patent
Ware et al.

(10) Patent No.: US 6,553,518 B1
(45) Date of Patent: Apr. 22, 2003

(54) SEVERE ERROR DETECTORS, METHODS AND COMPUTER PROGRAM PRODUCTS THAT USE CONSTELLATION SPECIFIC ERROR EVENT THRESHOLDS TO DETECT SEVERE ERROR EVENTS DURING DEMODULATION OF A SIGNAL COMPRISING SYMBOLS FROM A PLURALITY OF SYMBOL CONSTELLATIONS

(75) Inventors: Malcolm Scott Ware, Raleigh, NC (US); Gordon Taylor Davis, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/430,693

(22) Filed: Oct. 29, 1999

Related U.S. Application Data

(63) Continuation-in-part of application No. 09/264,094, filed on Mar. 8, 1999, now Pat. No. 6,341,360.

(51) Int. Cl.$^7$ ............................................. G06F 11/00
(52) U.S. Cl. ......................................... 714/704; 375/233
(58) Field of Search ............................ 74/704; 375/232, 375/233, 287

(56) References Cited

U.S. PATENT DOCUMENTS

| | | | |
|---|---|---|---|
| 3,557,308 A | 1/1971 | Alexander et al. | 178/69.5 |
| 3,622,877 A | 11/1971 | MacDavid et al. | 324/73 R |

(List continued on next page.)

FOREIGN PATENT DOCUMENTS

| | | | |
|---|---|---|---|
| EP | 0 473 116 A2 | 8/1991 | H04N/1/00 |
| EP | 0 659 007 A2 | 11/1994 | H04M/11/06 |

(List continued on next page.)

OTHER PUBLICATIONS

Ayanoglu, et al.; An Equalizer Design Technique for the PCM Modem: A New Modem for the Digital Public Switched Network; IEEE Transactions on Communications; vol. 46, No. 6; Jun. 1988; pp. 763–774.

(List continued on next page.)

*Primary Examiner*—Albert Decady
*Assistant Examiner*—Joseph D. Torres
(74) *Attorney, Agent, or Firm*—Scott W. Reid; Myers, Bigel, Sibley & Sajovec, P.A.

(57) ABSTRACT

Severe error detectors, methods, and computer program products use constellation specific error event thresholds to detect severe error events in a signal comprising symbols from a plurality of symbol constellations. In particular, a plurality of constellation thresholds are defined that correspond to a plurality of symbol or signal constellations. An output signal sample, which is associated with one of the plurality of symbol constellations, is received from a decision feedback equalizer. The absolute value of the output signal sample is compared with the constellation threshold that corresponds to the particular symbol constellation associated with the output signal sample. If the absolute value of the output signal sample exceeds the constellation threshold, then a severe error is recognized. The ITU V.90 Recommendation allows up to six different symbol or signal constellations to be used in the same communication session. The multiple constellations may be designed such that an error threshold suitable for one constellation may not be suitable for another constellation. As a result, a severe error detection circuit or module using a single constellation threshold for detecting severe errors may either under report or over report severe error events. Advantageously, multiple constellation thresholds may allow severe errors to be detected with greater precision than could be detected using a single constellation threshold.

21 Claims, 9 Drawing Sheets

U.S. PATENT DOCUMENTS

| | | |
|---|---|---|
| 3,683,120 A | 8/1972 | Schenkel .................. 179/15 A |
| 3,729,717 A | 4/1973 | de Koe et al. ........... 340/172.5 |
| 4,112,427 A | 9/1978 | Hofer et al. ................ 340/347 |
| 4,132,242 A | 1/1979 | Carroll, Jr. .................. 137/263 |
| 4,208,630 A | 6/1980 | Martinez ....................... 375/7 |
| 4,237,552 A | 12/1980 | Aikoh et al. ................... 370/83 |
| 4,270,027 A | 5/1981 | Agrawal et al. .......... 179/81 R |
| 4,434,322 A | 2/1984 | Ferrell ..................... 178/22.13 |
| 4,450,556 A | 5/1984 | Boleda et al. ................. 370/58 |
| 4,539,675 A | 9/1985 | Fisher ......................... 370/32 |
| 4,577,310 A | 3/1986 | Korsky et al. ................ 370/58 |
| 4,578,796 A | 3/1986 | Charalambous et al. ........ 375/8 |
| 4,720,861 A | 1/1988 | Bertrand ...................... 381/36 |
| 4,731,816 A | 3/1988 | Hughes-Hartogs ........... 379/98 |
| 4,756,007 A | 7/1988 | Qureshi et al. ................ 375/37 |
| 4,760,598 A | 7/1988 | Ferrell .......................... 380/44 |
| 4,797,898 A | 1/1989 | Martinez ....................... 375/7 |
| 4,833,706 A | 5/1989 | Hughes-Hartogs ........... 379/98 |
| 4,868,863 A | 9/1989 | Hartley et al. ................ 379/98 |
| 4,884,285 A | 11/1989 | Heynen et al. ............... 375/25 |
| 4,890,303 A | 12/1989 | Bader ......................... 375/107 |
| 4,890,316 A | 12/1989 | Walsh et al. ................. 379/98 |
| 4,894,847 A | 1/1990 | Tjahjadi et al. ............. 375/121 |
| 4,901,333 A | 2/1990 | Hodgkiss ..................... 375/98 |
| 4,943,980 A | 7/1990 | Dobson et al. ............... 375/42 |
| 4,953,210 A | 8/1990 | McGlynn et al. ............ 380/48 |
| 4,967,413 A | 10/1990 | Otani ........................ 371/37.4 |
| 4,972,360 A | 11/1990 | Cuckier et al. ......... 364/724.04 |
| 4,985,902 A | 1/1991 | Gurcan ......................... 375/14 |
| 4,991,169 A | 2/1991 | Davis et al. ................... 370/77 |
| 4,995,030 A | 2/1991 | Helf .......................... 370/32.1 |
| 5,005,144 A | 4/1991 | Nakajima et al. ........... 364/565 |
| 5,007,047 A * | 4/1991 | Sridhar et al. .............. 370/286 |
| 5,014,299 A | 5/1991 | Klupt et al. ................... 379/98 |
| 5,033,062 A | 7/1991 | Morrow et al. ................. 375/7 |
| 5,038,365 A | 8/1991 | Belloc et al. ................... 375/8 |
| 5,040,190 A | 8/1991 | Smith et al. ..................... 375/4 |
| 5,052,000 A | 9/1991 | Wang et al. .................. 371/43 |
| 5,058,134 A | 10/1991 | Chevillat et al. ............. 375/39 |
| 5,065,410 A | 11/1991 | Yoshida et al. ............... 375/98 |
| 5,067,125 A | 11/1991 | Tsuchida ...................... 370/79 |
| 5,068,875 A | 11/1991 | Quintin ........................ 375/78 |
| 5,107,520 A | 4/1992 | Karam et al. ................. 375/60 |
| 5,111,481 A | 5/1992 | Chen et al. .................... 375/14 |
| 5,119,401 A | 6/1992 | Tsujimoto .................... 375/14 |
| 5,119,403 A | 6/1992 | Krishnan ..................... 375/39 |
| 5,134,611 A | 7/1992 | Steinka et al. ................ 370/79 |
| 5,142,552 A | 8/1992 | Tzeng et al. .................. 375/14 |
| 5,157,690 A | 10/1992 | Buttle .......................... 375/14 |
| 5,187,732 A | 2/1993 | Suzuki .......................... 379/5 |
| 5,210,755 A | 5/1993 | Nagler et al. ............... 370/108 |
| 5,225,997 A | 7/1993 | Lederer et al. ............. 364/550 |
| 5,249,205 A | 9/1993 | Chennakeshu et al. ..... 375/101 |
| 5,253,272 A | 10/1993 | Jaeger et al. ................. 375/60 |
| 5,253,291 A | 10/1993 | Naseer et al. ............... 379/406 |
| 5,265,151 A | 11/1993 | Goldstein ..................... 379/97 |
| 5,271,011 A | 12/1993 | McMullan, Jr. et al. ..... 371/5.3 |
| 5,285,474 A | 2/1994 | Chow et al. .................. 375/13 |
| 5,291,479 A | 3/1994 | Vaziri et al. .............. 370/58.2 |
| 5,293,401 A | 3/1994 | Serfaty ......................... 375/13 |
| 5,309,484 A | 5/1994 | McLane et al. ............. 375/106 |
| 5,311,578 A | 5/1994 | Bremer et al. ................ 379/97 |
| 5,317,594 A | 5/1994 | Goldstein ....................... 375/8 |
| 5,351,134 A | 9/1994 | Yaguchi et al. ............. 358/435 |
| 5,353,280 A | 10/1994 | Ungerböck ................ 370/32.1 |
| 5,386,438 A | 1/1995 | England ..................... 375/121 |
| 5,394,110 A | 2/1995 | Mizoguchi .................. 329/304 |
| 5,394,437 A | 2/1995 | Ayanoglu et al. ........... 375/222 |
| 5,398,303 A | 3/1995 | Tanaka ......................... 395/51 |
| 5,402,445 A | 3/1995 | Matsuura .................... 375/229 |
| 5,406,583 A | 4/1995 | Dagdeviren ..................... 375/5 |
| 5,418,842 A | 5/1995 | Cooper ......................... 379/98 |
| 5,432,794 A | 7/1995 | Yaguchi ..................... 371/5.5 |
| 5,434,884 A | 7/1995 | Rushing et al. ............. 375/235 |
| 5,436,930 A * | 7/1995 | Bremer et al. .............. 370/207 |
| 5,471,508 A * | 11/1995 | Koslov ....................... 375/261 |
| 5,475,711 A | 12/1995 | Betts et al. .................. 375/240 |
| 5,490,169 A | 2/1996 | Blackwell et al. .......... 375/232 |
| 5,491,720 A | 2/1996 | Davis et al. ................. 375/222 |
| 5,513,216 A | 4/1996 | Gadot et al. ................ 375/233 |
| 5,517,213 A | 5/1996 | Bhatt et al. ................. 375/232 |
| 5,519,703 A | 5/1996 | Chauffour et al. ............ 370/84 |
| 5,526,378 A | 6/1996 | Knutson et al. ............. 375/229 |
| 5,528,625 A | 6/1996 | Ayanoglu et al. ........... 375/222 |
| 5,528,679 A | 6/1996 | Taarud ......................... 379/34 |
| 5,533,048 A | 7/1996 | Dolan ......................... 375/222 |
| 5,534,913 A | 7/1996 | Majeti et al. .................. 348/7 |
| 5,546,395 A | 8/1996 | Sharma et al. ................ 370/84 |
| 5,563,908 A | 10/1996 | Kaku et al. .................. 375/222 |
| 5,566,211 A | 10/1996 | Choi ........................... 375/332 |
| 5,588,025 A | 12/1996 | Strolle et al. ................ 375/316 |
| 5,598,401 A | 1/1997 | Blackwell et al. ............. 379/94 |
| 5,625,643 A | 4/1997 | Kaku et al. .................. 375/222 |
| 5,634,022 A | 5/1997 | Crouse et al. ............... 395/704 |
| 5,640,387 A | 6/1997 | Takahashi et al. ........... 370/359 |
| 5,646,958 A | 7/1997 | Tsujimoto ................... 375/233 |
| 5,668,833 A | 9/1997 | Kurokami et al. .......... 375/233 |
| 5,671,250 A | 9/1997 | Bremer et al. .............. 375/222 |
| 5,694,420 A | 12/1997 | Ohki et al. .................. 375/222 |
| 5,710,792 A | 1/1998 | Fukawa et al. ............. 375/229 |
| 5,710,793 A * | 1/1998 | Greenberg .................. 375/232 |
| 5,724,393 A | 3/1998 | Dagdeviren ................. 375/296 |
| 5,726,765 A | 3/1998 | Yoshida et al. ............. 358/412 |
| 5,729,226 A | 3/1998 | Betts et al. .................... 341/94 |
| 5,732,104 A | 3/1998 | Brown et al. ............... 375/222 |
| 5,734,663 A | 3/1998 | Eggenberger .............. 371/39.1 |
| 5,742,642 A | 4/1998 | Fertner ....................... 375/233 |
| 5,751,717 A | 5/1998 | Babu et al. .................. 370/466 |
| 5,751,796 A | 5/1998 | Scott et al. .............. 379/93.31 |
| 5,754,594 A | 5/1998 | Betts et al. .................. 375/285 |
| 5,757,849 A | 5/1998 | Gelblum et al. ............ 375/222 |
| 5,757,865 A | 5/1998 | Kaku et al. .................. 375/344 |
| 5,761,247 A | 6/1998 | Betts et al. .................. 375/316 |
| 5,768,311 A | 6/1998 | Betts et al. .................. 375/222 |
| 5,778,024 A | 7/1998 | McDonough ............... 375/216 |
| 5,784,377 A | 7/1998 | Baydar et al. ............... 370/463 |
| 5,784,405 A | 7/1998 | Betts et al. .................. 375/222 |
| 5,784,415 A | 7/1998 | Chevillat et al. ............ 375/341 |
| 5,793,809 A | 8/1998 | Holmquist ................... 375/242 |
| 5,796,808 A | 8/1998 | Scott et al. .............. 379/93.31 |
| 5,801,695 A | 9/1998 | Townshend ................. 375/340 |
| 5,805,669 A | 9/1998 | Bingel et al. ................. 379/28 |
| 5,809,075 A | 9/1998 | Townshend ................. 375/254 |
| 5,812,537 A | 9/1998 | Betts et al. .................. 370/286 |
| 5,815,534 A | 9/1998 | Glass .......................... 375/326 |
| 5,822,371 A | 10/1998 | Goldstein et al. ........... 375/242 |
| 5,825,816 A | 10/1998 | Cole et al. ................... 375/222 |
| 5,825,823 A | 10/1998 | Goldstein et al. ........... 375/286 |
| 5,831,561 A | 11/1998 | Cai et al. ..................... 341/106 |
| 5,835,532 A | 11/1998 | Strolle et al. ............... 375/233 |
| 5,835,538 A | 11/1998 | Townshend ................. 375/295 |
| 5,838,724 A | 11/1998 | Cole et al. ................... 375/222 |
| 5,839,053 A | 11/1998 | Bosch et al. ............... 455/13.1 |
| 5,844,940 A | 12/1998 | Goodson et al. ............ 375/222 |
| 5,850,388 A | 12/1998 | Anderson et al. ........... 370/252 |
| 5,850,421 A | 12/1998 | Misra et al. ................. 375/354 |
| 5,852,631 A | 12/1998 | Scott .......................... 375/222 |
| 5,862,141 A | 1/1999 | Trotter ....................... 370/468 |
| 5,862,179 A | 1/1999 | Goldstein et al. ........... 375/242 |
| 5,862,184 A | 1/1999 | Goldstein et al. ........... 375/295 |
| 5,870,429 A | 2/1999 | Moran, III et al. ......... 375/222 |

| | | | | |
|---|---|---|---|---|
| 5,872,817 A | | 2/1999 | Wei | 375/341 |
| 5,881,066 A | | 3/1999 | Lepitre | 371/20.5 |
| 5,881,102 A | | 3/1999 | Samson | 375/222 |
| 5,887,027 A | | 3/1999 | Cohen et al. | 375/222 |
| 5,911,115 A | | 6/1999 | Nair et al. | 455/63 |
| 5,914,982 A | | 6/1999 | Bjarnason et al. | 375/222 |
| 5,918,204 A | | 6/1999 | Tsurumaru | 704/214 |
| 5,926,506 A | | 7/1999 | Berthold et al. | 375/222 |
| 5,987,069 A | * | 11/1999 | Furukawa et al. | 370/281 |
| 5,999,349 A | | 12/1999 | Choi | 360/46 |
| 6,002,723 A | * | 12/1999 | Chethik | 375/317 |
| 6,005,893 A | * | 12/1999 | Hyll | 370/468 |
| 6,052,412 A | | 4/2000 | Ruether et al. | 375/231 |
| 6,081,822 A | * | 6/2000 | Hillery et al. | 708/200 |
| 6,091,824 A | | 7/2000 | Lin et al. | 381/63 |
| 6,141,378 A | * | 10/2000 | d'Oreye de Lantremange | 375/232 |
| 6,148,423 A | | 11/2000 | Le Mouel et al. | 714/708 |
| 6,151,364 A | | 11/2000 | Ruether et al. | 375/254 |
| 6,151,614 A | | 11/2000 | Ikeda | 708/322 |
| 6,167,095 A | * | 12/2000 | Furukawa et al. | 370/468 |
| 6,240,128 B1 | | 5/2001 | Banerjea et al. | 375/222 |
| 6,292,654 B1 | | 8/2001 | Hessel et al. | 455/223 |
| 6,304,594 B1 | * | 10/2001 | Salinger | 375/222 |
| 6,337,999 B1 | | 1/2002 | Orban | 700/94 |
| 6,341,360 B1 | | 1/2002 | Abdelilah | 714/704 |

FOREIGN PATENT DOCUMENTS

| | | | | |
|---|---|---|---|---|
| EP | 0 669 740 A2 | 12/1994 | | H04L/27/00 |
| FR | 2 345 019 | 3/1976 | | H04L/27/10 |
| WO | WO 96/18261 | 6/1996 | | H04M/11/00 |
| WO | WO 98/37657 | 8/1998 | | |

OTHER PUBLICATIONS

Picchi, G. et al.; A blind Sag–So–DFD–FS equalizer, Inst. Of Electron. & Telecommun., Pisa Univ., Italy, This paper appears in: Communications, 1988, ICC '88. Digital Technology–Spanning the Universe. Conference Record., IEEE International Conference.

Erup, et al., Interpolation in Digital Modems—Part II: Implementation and Performance, *IEEE Transactions on Communications*, vol. 41, No. 6, pp. 998–1008 (Jun. 1993).

Fischer, Signal Mapping for PCM Modems, *V–pcm Rapporteur Meeting*, Sunriver, Oregon, USA, , 5 pgs. (Sep. 4–12, 1997).

Gardner, Interpolation in Digital Modems—Part I: Fundamentals, *IEEE Transactions on Communications*, vol. 41, No. 3, pp. 501–507 (Mar. 1993).

Humblet et al., The Information Driveway, *IEEE Communications Magazine*, pp. 64–68 (Dec. 1996).

Kalet et al., The Capacity of PCM Voiceband Channels, *IEEE International Conference on Communications '93*, pp. 507–511 (Geneva, Switzerland, May 23–26, 1993).

Mueller et al., Timing Recovery in Digital Synchronous Data Receiver, *IEEE Transactions on Communications*, vol. Com–24, No. 5, pp. 516–531 (May 1976).

Okubo et al., Building Block Design of Large Capacity PCM–TDMA Subscriber System and Direct Digital Interface to Digital Exchange, Japan Radio Co., Ltd., pp. 69–73 (Japan).

Pahlavan et al., Nonlinear Quantization and the Design of Coded and Uncoded Signal Constellations, *IEEE Transactions on Communications*, vol. 39, No. 8, pp. 1207–1215 (Aug. 1991).

Proakis, Digital Signaling Over a Channel with Intersymbol Interference, *Digital Communications*, pp. 373, 381 (McGraw–Hill Book Company, 1983).

Williams et al., Counteracting the Quantisation Noise from PCM Codecs, BT Laboratories, pp. 24–29 (UK).

A Digital Modem and Analogue Modem Pair for Use on the Public Switched Telephone Network (PSTN) at Data Signalling Rates of Up to 56 000 Bit/s Downstream and 33 600 Bit/s Upstream, *ITU–T V.90* (Sep. 1998).

Series V: Data Communication Over the Telephone Network; Interfaces and voiceband modems; A modem operating at data signalling rates of up to 33 600 bit/s for use on the general switched telephone network and on leased point–to–point 2–wire telephone type circuits, *ITU–T V.34* (Oct. 1996).

Bell, R.A., et al., Automatic Speed Reduction and Switched Network Back–up, *IBM Technical Disclosure Bulletin*, vol. 32, No. 1, pp. 154–157 (Jun. 1989).

Abbiate, J.C., et al., Variable–Data Transmission Modem, *IBM Tecnical Disclosure Bulletin*, vol. 17, No. 11, pp. 3301–3302 (Apr. 1975).

Data Communication Over the Telephone Network; Procedures for Starting Sessions of Data Transmission Over the General Switched Telephone Network, *ITU–T V.8* (Sep. 1994).

Line Quality Monitoring Method, *IBM Technical Disclosure Bulletin*, vol. 18, No. 8, pp. 2726–2726 (Jan. 1976).

Loopback Tests for V.54 Data Communication Equipment, *IBM Technical Disclosure Bulletin*, vol. 32, No. 3A, pp. 295–299 (Aug. 1989).

On–Line Real Time Modem Testing, *IBM Technical Disclosure Bulletin*, vol. 20, No. 6, pp. 2252–2254 (Nov. 1977).

Pierobon, Gianfranco L., Codes of Zero Spectral Density at Zero Frequency, *IEEE Transactions on Information Theory*, vol. IT–30, No. 2, pp. 435–439 (Mar. 1984).

Marcus, Brian H, et al., On Codes with Spectral Nulls at Rational Submultiples of the Symbol Frequence, *IEEE Transactions on Information Theory*, vol. IT–33, No. 4, pp. 557–568 (Jul. 1987).

Fischer, Robert, et al., Signal Mapping for PCM Modems, *ITU–Telecommunications Standardization Sector PCM '97–120, V.pcm Rapporteur Meeting*, (Sunriver, Oregon; Sep. 4–12, 1997).

Pulse Code Modulation (PCM) of Voice Frequencies, *ITU–T*, Recommendation G.711 (Geneva, 1972).

Series G: Digital Transmission Systems: Terminal Equipments—Coding of analogue signals by pulse code modulation; Pulse code modulation (PCM) of voice frequencies, *ITU–T*, Recommendation G.711 (Geneva, 1996).

Data Communication Over the Telephone Network; Error–Correcting Procedures for DCEs Using Asynchronous–to–Synchronous Conversion, *ITU–T V.42* (Mar. 1993).

Improvement to Spectral Shaping Techniques, *Research Disclosure*, V. 41, n415,415111, pp. 1550–1551 (Nov. 1998).

*TIA Standard Draft: North American Telephone Network Transmission Model for Evaluating Analog Client to Digitally Connected Server Modems*, Telecommunications Industry Association, PN3857, Draft 10 (Feb. 1999).

Davis, Gordon T., DSP and MATLAB implementation of model–based constellation generation (Sep. 18, 1998).

Woodruff, K.R, et al, Automatic and Adaptive System and Efficient Communication in Noisy Communication Line Environments, *IBM Technical Disclosure Bulletin*, vol. 24, No. 9, pp. 4627–4629 (Feb. 1982).

Godard, D., et al., Decision Feedback Equalizer Stabilization in Adaptive Mode, *IBM Technical Disclosrue Bulletin,* vol. 24, No. 11A, pp. 5691–5692 (Apr. 1982).

Borgnis–Desbordes, P., et al. *Variable–Speed Data Transmission, IBM Technical Disclosure Bulletin,* vol. 27, No. 4A, pp. 2269–2270 (Sep. 1984).

Couland, G., et al., Analog Wrap Self–Tests in Modems During Retrain Operations, *IBM Technical Disclosure Bulletin,* vol. 28, No. 6, p. 2457 (Nov. 1985).

Maddens, F., Sixteen–State Forward Convolutional Encoder, *IBM Technical Disclosure Bulletin,* vol. 28, No. 6, pp. 2466–2468 (Nov. 1985).

Remote Modem–Type Self–Learning, *IBM Technical Disclosure Bulletin,* vol. 28, No. 6, pp. 2398–2399 (Nov. 1985).

Maddens, F., Sixteen–State Feedback Convolutional Encoder, *IBM Technical Disclosure Bulletin,* vol. 28, No. 10, pp. 4212–4213 (Mar. 1986).

Bell, R. A., et al., Automatic Speed Reduction and Switched Network Back–up, *IBM Technical Disclosure Bulletin,* vol. 32, No. 1, pp. 154–157 (Jun. 1989).

Nobakht, R.A., Trellis–Coded Modulation Coding Scheme for a 19/2 Kbps Modem, *IBM technical Disclosure Bulletin,* vol. 36, No. 11, pp. 167–170 (Nov. 1993).

Nobakht, R.A. Unified Table Based Subset Decoder for the Viterbi Algorithm, *IBM Technical Disclosure Bulletin,* vol. 37, No. 09, pp. 581–587 (Sep. 1994).

Nobakht, R.A., Trellis Subset Decoder Algorithm Based on a Pattern Recognition Scheme, *IBM Technical Disclosure Bulletin,* vol. 37, No. 10, pp. 693–697 (Oct. 1994).

Abbiate, J.C., et al, Variable–Data Transmission Modem, *IBM Technical Disclosure Bulletin,* vol. 17, No. 11, pp. 3301–3302 (Apr. 1975).

Barlet, J., et al., Full Speed Recovery in High Speed Modems, *IBM Technical Disclosure Bulletin,* vol. 17, 23, No. 2, pp. 641–643 (Jul. 1980).

Dialog Abstract, Sample rate converter for duplex modem, European Patent No. 285413.

Dialog Abstract, Two–speed full–duplex modem for telephone network, PCT WO 8501407.

Dialog Abstract, Digital data transmission system, European Patent No. 124674.

Dialog Abstract, Facsimile communication controller, Japanese Publication No. 04–175060 (Jun. 23, 1992).

Dialog Abstract, Picture communication equipment, Japanese Publication No. 03–120954 (May 23, 1991).

Dialog Abstract, Radio date transmission, Japanese Publication No. 01–179535 (Jul. 17, 1989).

Dialog Abstract, Facsimile device, Japanese Publication No. 57–164654 (Oct. 9, 1982).

Dialog Abstract, Data repeater, Japanese Publication No. 57–087255 (Mar 31, 1982).

Dialog Abstract, Blinding training method for decision feedback equaliser having feed–forward and feedback filters, European Patent No. 880253.

Dialog Abstract, Processing method for distorted signal received by qam receiver, European Patent No. 465851.

Dialog Abstract, Establishing wireless communication channel, PCT No. WO 9905820.

Dialog Abstract, High–speed rate adaptive subscriber line digital data modem, PCT No. WO 9830001.

Dialog Abstract, Digital modem in digital modulation system, Japanese Patent No. 8116341.

Dialog Abstract, Communication equipment and radio communication adapter, Japanese Publication No. 08–340289 (Dec. 24, 1996).

Dialog Abstract, Data recording method, Japanese Publication No. 05–089597 (Apr. 9, 1993).

Dialog Abstract, Transmission control system for data communication and its modem equipment, Japanese Publication No. 02–228853 (Sep. 11, 1990).

Nabuib, A.F., et al., Dialog Abstract, A space–time coding modem for high–data–rate wireless communication, *IEEE Journal of Selected Areas in Communications,* vol. 16, No. 8, pp. 1459–1478 (Oct. 1998).

Denno, S., et al., Dialog Abstract, Mbit/s burst modem with an adaptive equalizer for TDMA mobile radio communication, *IEICE Transactions on Communications,* vol. E81–B, No. 7, pp. 1453–1461 (Jul. 1998).

Naguib, A.F., et al., Dialog Abstract, A space–time coding modem for high–data–rate wireless communications, *GLOBECOM 97, IEEE Global Telecommunications Conference,* vol. 1, pp. 102–109 (1997).

Kobayashi, K., et al., Dialog Abstract, Fully digital burst modem for satellite multimedia communications sytems, *IEICE Transactions on Communications,* vol. E80–B, No. 1, pp. 8–15 (Jan. 1997).

Skellern, D.J., et al., Dialog Abstract, A high speed wireless LAN, *IEEE Micro,* vol. 17, No. 1, pp. 40–47 (Jan.–Feb. 1997).

Enomoto, K., et al., Dialog Abstract, *A mode switching type burst demodulator AFC, Transactions of the Institute of Electronics, Information and Communication Engineers,* vol. J76BII, No. 5, pp. 415–421 (May 1993).

Betts, W., Dialog Abstract, Nonlinear encoding by surface projection, *International Conference on Data Transmission—Advances in Modem and ISDN Technology and Applications* (Sep. 23–25, 1992).

Schilling, D.L., et al., Dialog Abstract, The FAVR meteor burst communication experiment, *Military Communications in a Changing World MILCOM '91* (Nov. 4–7, 1991).

Jacobsmeyer, J.M., Dialog Abstract, Adaptive trellis–coded modulation for bandlimited meteor burst channels, *IEEE Journal of Selected Areas in Communications,* vol. 10, No. 3, pp. 550–561 (Apr. 1992).

Sato, T., et al., Dialog Abstract, Protocol configuration and verification of an adaptive error control schemme over analog cellular networks, *IEEE Transactions on Vehicular Technology,* vol. 41, No. 1, pp. 69–76 (Feb. 1992).

Lee, L.–N., et al., Dialog Abstract, Digital signal processor–based programmable BPSK/QPSK/offset–QPSK modems, *COMSAT Technical Review,* pp. 195–234 (Fall 1989).

Sato, T., et al., Dialog Abstract, Error–free high–speed data modem, *Oki Technical Review,* vol. 56, No. 133, pp. 20–26 (Apr. 1989).

Seo, J.–S, et al., Dialog Abstract, Performance of convolutional coded SQAM in hardlimited satellite channels, *IEEE International Conference on Communications BOSTON–ICC/89,* vol. 2, pp. 787–791 (Jun. 11–14, 1989).

Murakama, K., et al., Dialog Abstract, FEC combined burst–modem for business satellite communications use, *IEEE/IECE Global Telecommunications Conference 1987,* vol. 1, pp. 274–280 (Japan, Nov. 15–18, 1987).

McVerry, F., Dialog Abstract, Performance of a fast carrier recovery scheme for burst–format DQPSK transmission over satellite channels, *International Conference on Digital Processing of Signals in Communications*, pp. 165–172 (United Kingdom, 1985).

Filter, J.H.J., Dialog Abstract, An algorithm for detecting loss of synchronisation in data transmission test sets (modems), *Transactions of the South African Institute of Electrical Engineers*, vol. 76, No. 1, pp. 39–43 (Jan. 1985).

Gersho, A., Dialog Abstract, Reduced complexity implementation of passband adaptive equlizers, *IEEE Journal on Selected Areas in Communications*, vol. SAC–2, No. 5, pp. 778–779 (Sep. 1984).

Dialog Abstract, High–speed full–duplex modem reduces telephone connect time, *EDN*, vol. 27, No. 18, p. 77 (Sep. 15, 1982).

Chadwick, H., Dialog Abstract, Performance of a TDMA burst modem through a dual nonlinear satellite channel, *Fifth International Conference on Digital Satellite Communications*, pp. 63–67 (Italy, Mar. 23–26, 1981).

Nussbaumer, H., Dialog Abstract, Reducing the acquisition time in an automatic equalizer, *IBM Technical Disclosure Bulletin*, vol. 18, No. 5, pp. 1465–1479 (Oct. 1975).

Uzunoglu, V., et al., Dialog Abstract, Synchronous and the coherent phase–locked synchronous oscillators: new techniques in synchronization and tracking, *IEEE Transactions on Circuits and Systems*, vol. 36, No. 7, pp. 997–1004 (Jul. 1989).

Minei, I., et al., Dialog Abstract, High–speed Internet access through unidirectional geostationary satellite channels, *IEEE Journal on Selected Areas in Communications*, vol. 17, No. 2, pp. 345–359 (Feb., 1999).

Ovadai, S., Dialog Abstract, The effect of interleaver depth and QAM channel frequencey offset on the performance of multichannel AM–VSB/256–QAM video lightwave transmission systems, *International Conference on Telecommunications: Bridging East and West Through Communications*, vol. 1, pp. 339–343 (Greece, Jun. 21–25, 1998).

Johnson, R.W., et al., Dialog Abstract, Error correction coding for serial–tone HG transmission, *Seventh International Conference on HF Radio Systems, and Techniques*, pp. 80–84 (United Kingdom, Jul. 7–10, 1997).

Karasawa, Y., et al., Dialog Abstract, Cycle slip in clock recovery on frequency–selective fading channels, *IEEE Transactions on Communications*, vol. 45, No. 3, pp. 376–383 (Mach. 1997).

Umehira, M., et al., Dialog Abstract, design and performance of burst carrier recovery using a phase compensated filter, *Transactions of the Institute of Electronics, Information and Communication Engineers*, vol. J78B–II, No. 12, pp. 735–746 (Dec. 1995).

De Bot, P., et al., Dialog Abstract, An example of a multi–resolution digital terrestrial TV modem, *Proceeings of ICC '93—IEEE International Conference on Communications*, vol. 3, pp. 1785–1790 (Switzerland, May 23–26, 1993).

Lei, Chen, et al., Dialog Abstract, Single–tone HF High speed data modem, *Proceedings of Tencon '93—IEEE Region 10 International Conference on Computers, Communications and Automation*, vol. 3, pp. 94–98 (China, Oct. 19–21, 1993).

Woerner, B.D., et al., Dialog Abstract, Simulation issues for future wireless modems, *IEEE Communications*, vol. 32, No. 7, pp. 42–53 (Jul. 1994).

Sato, T., et al., Dialog Abstract, Vehicle terminal equipment with dedicated DSP, *Oki Technical Review*, vol. 58, No. 144, pp. 49–52 (Jul. 1992).

Sato, T., et al., Dialog Abstract, Protocol configuration and verification of an adaptive error control scheme over analog cellular networks, *IEEE Transactions on Vehicular Technology*, vol. 41, No. 1, pp. 69–76 (Feb. 1992).

Tamm, Yu.A., Dialog Abstract, The effect of suppressing harmonic interference using an adaptive equalizer, *Elektrosvyaz*, vol. 45, No. 3, pp. 5–10 (Mach. 1990).

Saleh, A.A.M., et al., Dialog Abstract, An experimental TDMA indoor radio communications systemusing slow frequency hopping and coding, *IEEE Transactions on Communications*, vol. 39, No. 1, pp. 152–162 (Jan. 1991).

Nergis, A., Dialog Abstract, Optimum HF digital communications sytems with block coding and interleaving techniques, *Proceedings of the 1990 Bilkent International Conference on New Trends in Communication, Control and Signal Processing*, vol. 1, pp. 511–517 (Turkey, Jul. 2–5, 1990).

Kawamata, F., et al., Dialog Abstract, An evaluation of voice codecs and facsimiles, *Review of the Communications Research Laboratory*, vol. 36, pp. 69–73 (Mar. 1990).

Sato, T., et al., Dialog Abstract, Error–free high–speed data transmission protocol simultaneously applicable to both wire and mobile radio channels, *38$^{th}$ IEEE Vehicular Technology Conference: 'Telecommunications Freedom—Technology on the Move'*, pp. 489–496 (Jun. 15–17, 1988).

Dialog Abstract, 1200–bit/s cellular modem DLD03H, *Oki Technical Review*, vol. 53, No. 127, pp. 70–72 (Jul. 1987).

Chamberlin, J.W., et al., Dialog Abstract, Design and field test of a 256–QAM DIV modem, *IEEE Journal on Selected Areas in Communications*, vol. SAC–5, No. 3, pp. 349–356 (Apr. 1987).

De Cristofaro, R., et al., Dialog Abstract, A 120 Bv/s QPSK modem designed for the INTELSAT TDMA network, *International Journal of Satellite Communications*, vol. 3, Nos. 1–2, pp. 145–160 (Jan.Jun., 1985).

Shumate, A., Dialog Abstract, Error correction coding for channels subject to occasional losses of bit count integrity, *IEEE Military Communications Conference*, vol. 1, pp. 89–93 (Oct. 21–24, 1984).

Suyderhoud, H., et al., Dialog Abstract, Investigation of 9.6 kb/s data transmission via a PCM link at 64 kb/s with and without link errors, *International Journal of Satellite Communications*, vol. 2, No. 1, pp. 81–87 (Jan.–Mar. 1984).

Smith, C., Dialog Abstract, Relating the performance of speech processors to the bit error rate, *Speech Technology*, vol. 2, No. 1, pp. 41–53 (Sep.–Oct. 1983).

Suyderhoud, H., et al., Dialog Abstract, Investigation of 9.6–kbit/s data transmission via a PCM link at 64 kbit/s with and without link errors, *Sixth International Conference on Digital Satellite Communications Proceedings*, pp. 26–33 (Sep. 19, 23, 1983).

Kittel, L., Dialog Abstract, Analogue and discrete channel models for signal transmission in mobile radio, *Frequenz.*, vol. 36, Nos. 4–5, pp. 153–160 (Apr.–May 1982).

Farrell, P.G., et al., Dialog Abstract, Soft–decision error control of h.f. data transmission, *IEE Proceedings F (Communications, Radar and Signal Processing)*, vol. 127, No. 5, pp. 389–400 (Oct. 1980).

Johnson, A.L., Dialog Abstract, Simulation and implementation of a modulation system for overcoming ionospheric scintillation fading, *AGARD Conference Proceedings No. 173 on Radio Systems, and the Ionosphere*, pp. 3/1–5 (Greece, May 26–30, 1975).

Matsumura, K., et al., Dialog Abstract, Anti–interference data–transmission set of HF radio equipment, *Mitsublishi Electric Engineer*, No. 41, pp. 18–23 (Sep., 1974).

Blank, H.A., et al., Dialog Abstract, A Markov error channel model, *1973 National Telecommunications Conference*, vol. 1, pp. 15B/1–8 (Nov. 26–28, 1973).

McGruther, W.G., Dialog Abstract, Long term error performance data for operation at 2400 bps ona nonswitched private line network, *Summaries of papers presented at 1970 Canadian symposium on communications*, pp. 65–66 (Canada, Nov. 12–13, 1970).

Burton, H.O., et al., Dialog Abstract, On the use of error statistics from data transmission on telephone facilities to estimate performance of forward–error–correction, *1970 international conference on communications*, p. 21 (Jun. 8–10, 1970).

Bowen, R.R., Dialog Abstract, Application on burst error correction codes to data modems for dispersive channels, *Proceedings of the 1970 international symposium on information theory*, p. 1 (Netherlands, Jun. 15–19, 1970).

Pierce, A.W., et al., Dialog Abstract, Effective application of forward–acting error–control coding to multichannel h.f. data modems, *IEEE Transactions on Communication Technology*, vol. Com–18, No. 4, pp. 281–294 (Aug. 1970).

West, R.L., Abstract, Data Concentration Method, *IBM Technical Dislcosure Bulletin*, pp. 487–489; http://w3.infogate.ibm.com:1207/SESS506884/GETDOC/39/2/1 (Jul., 1975).

Haas, L.C., et al., Abstract, Received Line Signal Quality Analysis, *IBM Technical Disclosure Bulletin*, pp. 5414–5416; http://w3.infogate.ibm.com:1207/SESS506884/GETDOC/43/1/1 (May, 1981).

Nussbaumer, H., Abstract, Reducing the Acquisition Time in an Automatic Equalizer, *IBM Technical Disclosure Bulletin*, pp. 1465–1479; http://w3.infogate.ibm.com:1207/SESS506884/GETDOC/40/2/1 (Oct. 1975).

Dialog Abstract, Listener echo canceller for digital communication system, PCT No. WO 9310607.

Dialog Abstract Reduced time remote access method for modem computer, PCT No. WO 9209165.

\* cited by examiner

SEVERE ERROR DETECTORS, METHODS AND COMPUTER PROGRAM PRODUCTS THAT USE CONSTELLATION SPECIFIC ERROR EVENT THRESHOLDS TO DETECT SEVERE ERROR EVENTS DURING DEMODULATION OF A SIGNAL COMPRISING SYMBOLS FROM A PLURALITY OF SYMBOL CONSTELLATIONS

CROSS REFERENCE TO RELATED APPLICATION

This application is a continuation-in-part of U.S. application Ser. No. 09/264,094 (now U.S. Pat. No. 6,341,360), entitled DECISION FEEDBACK EQUALIZERS, METHODS, AND COMPUTER PROGRAM PRODUCTS FOR DETECTING SEVERE ERROR EVENTS AND PRESERVING EQUALIZER FILTER CHARACTERISTICS IN RESPONSE THERETO, filed Mar. 8, 1999, the disclosure of which is hereby incorporated herein by reference.

FIELD OF THE INVENTION

The present invention relates generally to the field of digital signal processing, and, more particularly, to decision feedback equalizers that have an error handling or error recovery capability.

BACKGROUND OF THE INVENTION

The demand for remote access to information sources and data retrieval, as evidenced by the success of services such as the World Wide Web, is a driving force for high-speed network access technologies. The public switched telephone network (PSTN) offers standard voice services over a 4 kHz bandwidth. Traditional analog modem standards generally assume that both ends of a modem communication session have an analog connection to the PSTN. Because data signals are typically converted from digital to analog when transmitted towards the PSTN and then from analog to digital when received from the PSTN, data rates may be limited to 33.6 kbps as defined in the V.34 Transmission Recommendation developed by the International Telecommunications Union (ITU).

The need for an analog modem may be eliminated, however, by using the basic rate interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. ISDN offers comfortable data rates for Internet access, telecommuting, remote education services, and some forms of video conferencing. ISDN deployment, however, has generally been very slow due to the substantial investment required of network providers for new equipment. Because ISDN is not very pervasive in the PSTN, the network providers have typically tariffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's central office (CO). Local telephone companies have been replacing portions of their original analog networks with digital switching equipment. Nevertheless, the connection between the home and the CO has been the slowest to change to digital as discussed in the foregoing with respect to ISDN BRI service. A recent data transmission recommendation issued by the ITU, known as V.90, takes advantage of the digital conversions that have been made in the PSTN. By viewing the PSTN as a digital network, V.90 technology can accelerate data downstream from the Internet or other information source to a subscriber's computer at data rates of up to 56 kbps, even when the subscriber is connected to the PSTN via an analog local loop.

To understand how the V.90 Recommendation achieves this higher data rate, it may be helpful to briefly review the operation of V.34 analog modems. V.34 modems are generally optimized for a configuration in which both ends of a communication session are connected to the PSTN by analog lines. Even though most of the PSTN is digital, V.34 modems treat the network as if it were entirely analog. Moreover, the V.34 Recommendation assumes that both ends of the communication session suffer impairment due to quantization noise introduced by analog-to-digital converters. That is, the analog signals transmitted from the V.34 modems are sampled at 8000 times per second by a codec upon reaching the PSTN with each sample being represented or quantized by an eight-bit pulse code modulation (PCM) codeword. The codec uses 256, non-uniformly spaced, PCM quantization levels defined according to either the $\mu$-law or A-law companding standard (i.e., the ITU G.711 Recommendation).

Because the analog waveforms are continuous and the binary PCM codewords are discrete, the digits that are sent across the PSTN can only approximate the original analog waveform. The difference between the original analog waveform and the reconstructed quantized waveform is called quantization noise, which limits the modem data rate.

While quantization noise may limit a V.34 communication session to 33.6 kbps, it nevertheless affects only analog-to-digital conversions. The V.90 standard relies on the lack of analog-to-digital conversions in the downstream path, outside of the conversion made at the subscriber's modem, to enable transmission at 56 kbps.

The general environment for which the V.90 standard has been developed is depicted in FIG. 1. An Internet Service Provider (ISP) 22 is connected to a subscriber's computer 24 via a V.90 digital server modem 26, through the PSTN 28 via digital trunks (e.g., T1, E1, or ISDN Primary Rate Interface (PRI) connections), through a central office switch 32, and finally through an analog loop to the client's modem 34. The central office switch 32 is drawn outside of the PSTN 28 to better illustrate the connection of the subscriber's computer 24 and modem 34 into the PSTN 28. It should be understood that the central office 32 is, in fact, a part of the PSTN 28. The operation of a communication session between the subscriber 24 and an ISP 22 is best described with reference to the more detailed block diagram of FIG. 2.

Transmission from the server modem 26 to the client modem 34 will be described first. The information to be transmitted is first encoded using only the 256 PCM codewords used by the digital switching and transmission equipment in the PSTN 28. These PCM codewords are transmitted towards the PSTN 28 by the PCM transmitter 36 where they are received by a network codec. The PCM data is then transmitted through the PSTN 28 until reaching the central office 32 to which the client modem 34 is connected. Before transmitting the PCM data to the client modem 34, the data is converted from its current form as either µ-law or A-law companded PCM codewords to pulse amplitude modulated (PAM) voltages by the codec expander (digital-to-analog (D/A) converter) 38. These PAM voltage levels are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals. Finally, the analog signal from the hybrid 44 is converted into digital PAM samples by an analog-to-digital (A/D) converter 46, which are received and decoded by the PAM receiver 48. Note that for transmission to succeed effectively at 56 kbps, there must be only a single digital-to-analog conversion and subsequent analog-to-digital conversion between the server modem 26 and the client modem 34. Recall that analog-to-digital conversions in the PSTN 28 may introduce quantization noise, which may limit the data rate as discussed hereinbefore. The A/D converter 46 at the client modem 34, however, may have a higher resolution than the A/D converters used in the analog portion of the PSTN 28 (e.g., 16 bits versus 8 bits), which results in less quantization noise. Moreover, the PAM receiver 48 needs to be in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as quadrature amplitude modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either µ-law or A-law companded PCM codewords by the codec compressor (A/D converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

The V.90 standard offers increased data rates (e.g., data rates up to 56 kbps) in the downstream direction from a server to a subscriber or client. Upstream communication still takes place at conventional data rates as provided for in the V.34 standard. Nevertheless, this asymmetry may be particularly well suited for Internet access. For example, when accessing the Internet, high bandwidth is most useful when downloading large text, video, and audio files to a subscriber's computer. Using V.90, these data transfers can be made at up to 56 kbps. On the other hand, traffic flow from the subscriber to an ISP consists mainly of keystroke and mouse commands, which are readily handled by the conventional rates provided by V.34.

As described above, the digital portion of the PSTN 28 transmits information using eight-bit PCM codewords at a frequency of 8000 Hz. Thus, it would appear that downstream transmission should take place at 64 kbps rather than 56 kbps as defined by the V.90 standard. While 64 kbps is a theoretical maximum, several factors prevent actual transmission rates from reaching this ideal rate. First, even though the problem of quantization error has been substantially eliminated by using PCM encoding and PAM for transmission, additional noise in the network or at the subscriber premises, such as non-linear distortion and crosstalk, may limit the maximum data rate. Furthermore, the µ-law or A-law companding techniques do not use uniform PAM voltage levels for defining the PCM codewords. The PCM codewords representing very low levels of sound have PAM voltage levels spaced close together. Noisy transmission facilities may prevent these PAM voltage levels from being distinguished from one another thereby causing loss of data. Accordingly, to provide greater separation between the PAM voltages used for transmission, not all of the 256 PCM codewords are used.

It is generally known that, assuming a convolutional coding scheme, such as trellis coding, is not used, the number of symbols required to transmit a certain data rate is given by Equation 1:

$$bps = R_s \log_2 N_s \qquad \text{EQ. 1}$$

where bps is the data rate in bits per second, $R_s$ is the symbol rate, and $N_s$ is the number of symbols in the signaling alphabet or constellation. To transmit at 56 kbps using a symbol rate of 8000, Equation 1 can be rewritten to solve for the number of symbols required as set forth below in Equation 2:

$$N_s = 2^{56000/8000} = 128 \qquad \text{EQ. 2}$$

Thus, the 128 most robust codewords of the 256 available PCM codewords are chosen for transmission as part of the V.90 standard.

The V.90 standard, therefore, provides a framework for transmitting data at rates up to 56 kbps provided the network is capable of supporting the higher rates. The most notable requirement is that there can be at most one digital-to-analog conversion and no analog-to-digital conversion in the downstream path in the network. Nevertheless, other digital impairments, such as robbed bit signaling (RBS) and digital mapping through PADs, which results in attenuated signals, may also inhibit transmission at V.90 rates. Communication channels exhibiting non-linear frequency response characteristics are yet another impediment to transmission at the V.90 rates. Moreover, these other factors may limit conventional V.90 performance to less than the 56 kbps theoretical data rate.

In addition to the foregoing factors, errors in demodulating the V.90 signal in the client modem 34 may also affect V.90 performance. The PAM receiver 48 may include a decision feedback equalizer (DFE) for demodulating the incoming V.90 signal, which, because of the feedback configuration, may result in error events that last for many symbol intervals. As a result, even small bursts of errors may be catastrophic for the PAM receiver 48 if the equalizer coefficients become "detuned" and receiver timing synchronization is lost. Unfortunately, detecting error events at the PAM receiver 48 is further complicated because V.90 allows multiple symbol constellations to be used in a single communication session. Each symbol constellation may be uniquely designed such that an error event threshold for one symbol constellation may not be applicable to another symbol constellation.

U.S. Pat. No. 5,157,690 to Buttle, U.S. Pat. No. 5,052,000 to Wang et al., and U.S. Pat. No. 5,394,110 to Mizoguchi describe techniques for minimizing the impact of symbol detection errors on an equalizer system or correcting detection errors when they occur.

Nevertheless, there exists a need for improvements in V.90 modem technology to allow V.90 modems to better detect error events and to reduce the impact such errors may have on a receiver in general and a decision feedback equalizer in particular.

SUMMARY OF THE INVENTION

It is an object of the present invention to improve the detection of severe error events in decision feedback equalizers when demodulating a signal comprising symbols from a plurality of symbol constellations.

It is another object of the present invention to improve the stability of decision feedback equalizers under severe error event conditions.

These and other objects, advantages, and features of the present invention may be provided by severe error detectors, methods, and computer program products that use constellation specific error event thresholds to detect severe error events in a signal comprising symbols from a plurality of symbol constellations. In particular, a plurality of constellation thresholds are defined that correspond to a plurality of symbol or signal constellations. An output signal sample, which is associated with one of the plurality of symbol constellations, is received from a decision feedback equalizer. The absolute value of the output signal sample is compared with the constellation threshold that corresponds to the particular symbol constellation associated with the output signal sample. If the absolute value of the output signal sample exceeds the constellation threshold, then a severe error is recognized.

The ITU V.90 Recommendation allows up to six different symbol or signal constellations to be used in the same communication session. The multiple constellations may be designed such that an error threshold suitable for one constellation may not be suitable for another constellation. As a result, a severe error detection circuit or module using a single constellation threshold for detecting severe errors may either under report or over report severe error events. If severe errors are under reported, then the decision feedback equalizer and receiver may fall into an unreliable state because the equalizer filter coefficients have been pulled away from normal operating values in an attempt to adapt to the severe errors. If severe errors are over reported, the decision feedback equalizer and receiver may fall into error recovery more often than necessary, which may reduce throughput.

Advantageously, the present invention allows separate constellation thresholds to be applied to each symbol or signal constellation for detecting severe errors. The multiple constellation thresholds may allow severe errors to be detected with greater precision than could be detected using a single constellation threshold.

In accordance with an aspect of the present invention, if a severe error occurs, then a determination is made whether the number of severe errors that have occurred has exceeded an error event threshold. If the error event threshold has been exceeded, then the coefficients for the filter(s) in the decision feedback equalizer are preserved in their current state via suspension of normal coefficient update procedures.

In accordance with another aspect of the present invention, an error counter is used that is incremented by a first constant if a severe error has been recognized and decremented by a second constant if a severe error has not been recognized. The error counter is compared with the error event threshold to determine whether to preserve the coefficients for the filter(s) in the decision feedback equalizer in their current state.

In accordance with yet another aspect of the present invention, an error recovery protocol is invoked if the number of severe error occurrences exceeds the first error event threshold.

Severe errors may cause the equalizer filter coefficients to be pulled away from their normal operating values, which may result in many modulation cycles passing before the coefficients are restored. As a result, the equalizer may become unstable and a retrain may be initiated. By preserving the equalizer filter coefficients under severe error conditions, the present invention prevents sharp or dramatic changes to the coefficient values from their steady state values, which may allow the decision feedback equalizer to recover more quickly from the errors.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENTS

Figure 1:
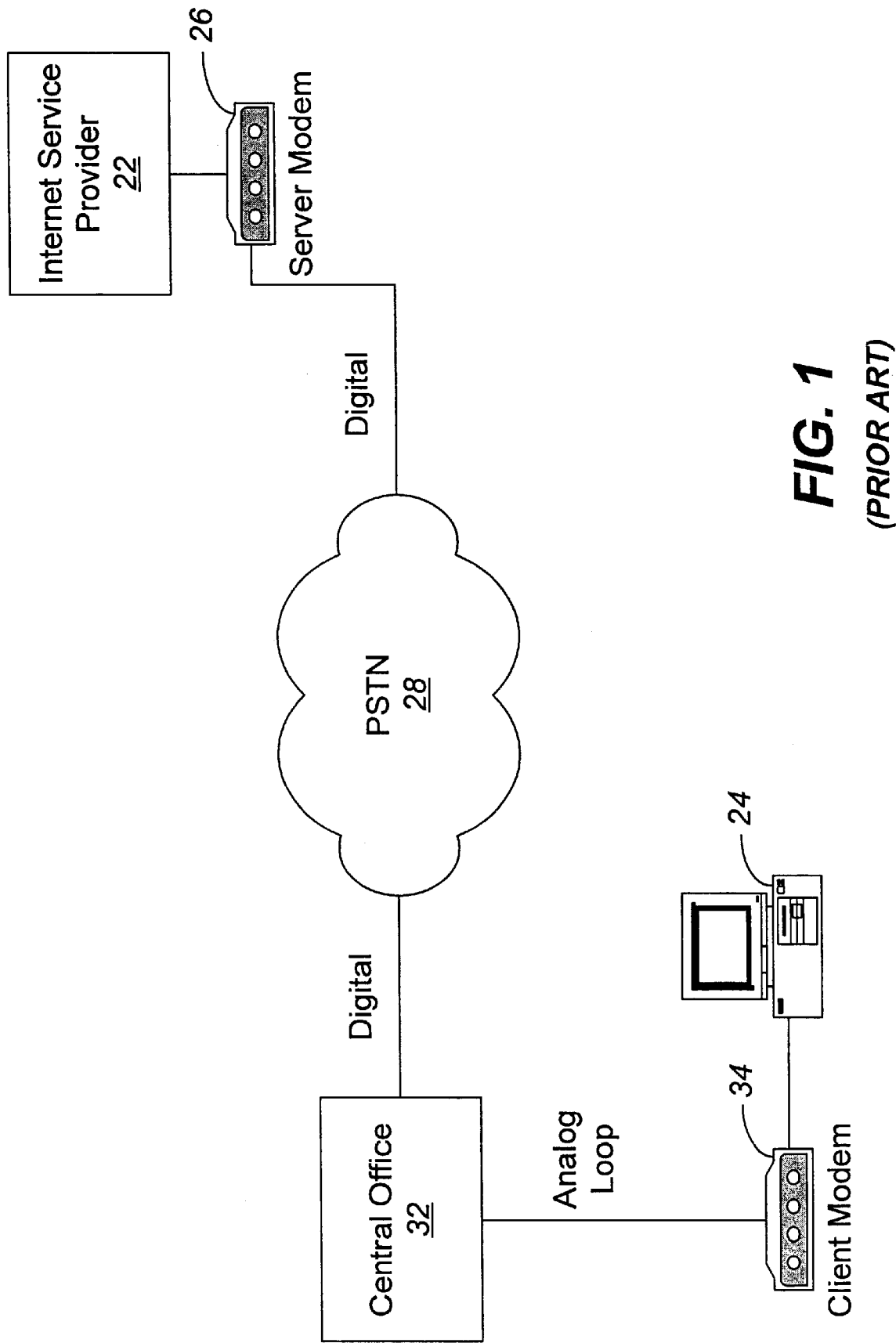
FIG. 1 is block diagram that illustrates a typical V.90 connection between a subscriber and an ISP in accordance with the prior art.
Figure 2:
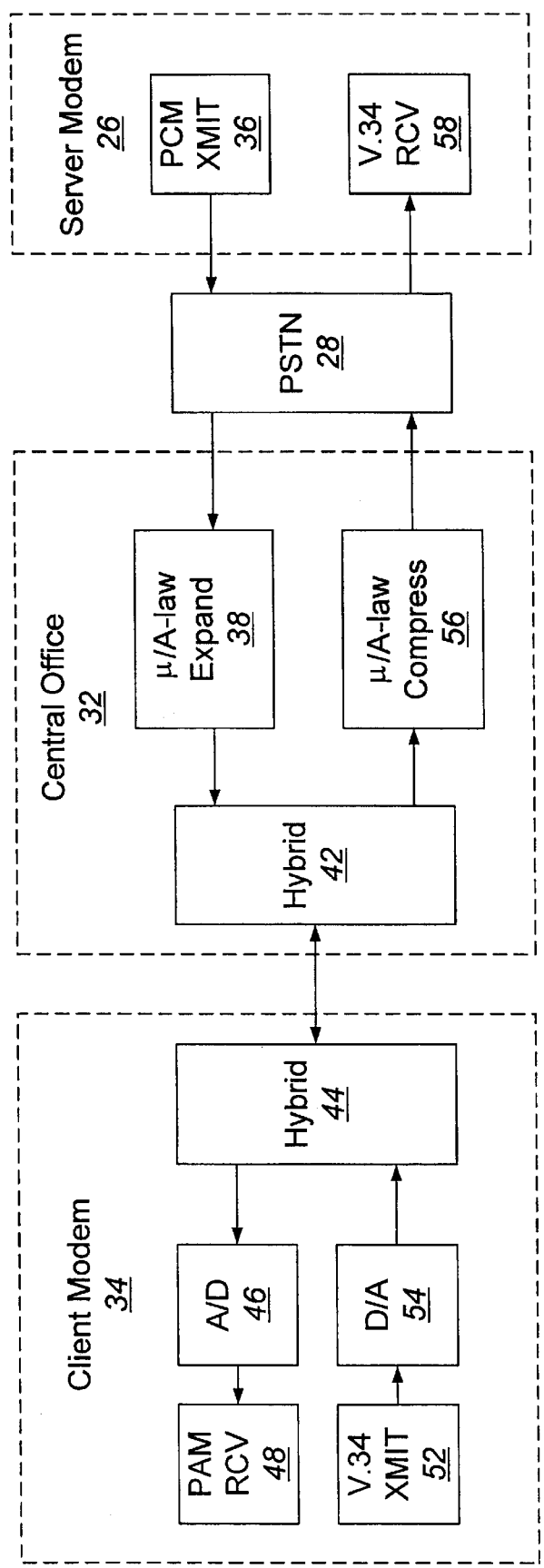
FIG. 2 is a block diagram that illustrates an internal architecture of a client modem, a central office, and a server modem shown in FIG. 1 and connections therebetween.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

The present invention may be embodied as a severe error detector, a method, or a computer program product. Accordingly, the present invention may take the form of an entirely hardware embodiment, an entirely software (including firmware, resident software, micro-code, etc.) embodiment, or an embodiment containing both software and hardware aspects. Furthermore, the present invention may take the form of a computer program product on a computer-usable or computer-readable storage medium having computer-usable program code means embodied in the medium for use by or in connection with an instruction execution system. In the context of this document, a computer-usable or computer-readable medium may be any means that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in a high level programming language such as C or C++. Some modules or routines, however, may be written in assembly language, machine language, or micro-code to optimize speed, memory usage, or layout of the software or firmware in memory. In a preferred embodiment, the present invention uses microcode to implement most software programs. It should further be understood that the program code for carrying out operations of the present invention may also execute entirely on a client modem, partly on a client modem, partly on a client modem and partly on a server modem, or partly in a client modem, partly in a server modem, and partly in the PSTN.

V.90 Client Modem Architecture

Figure 3:
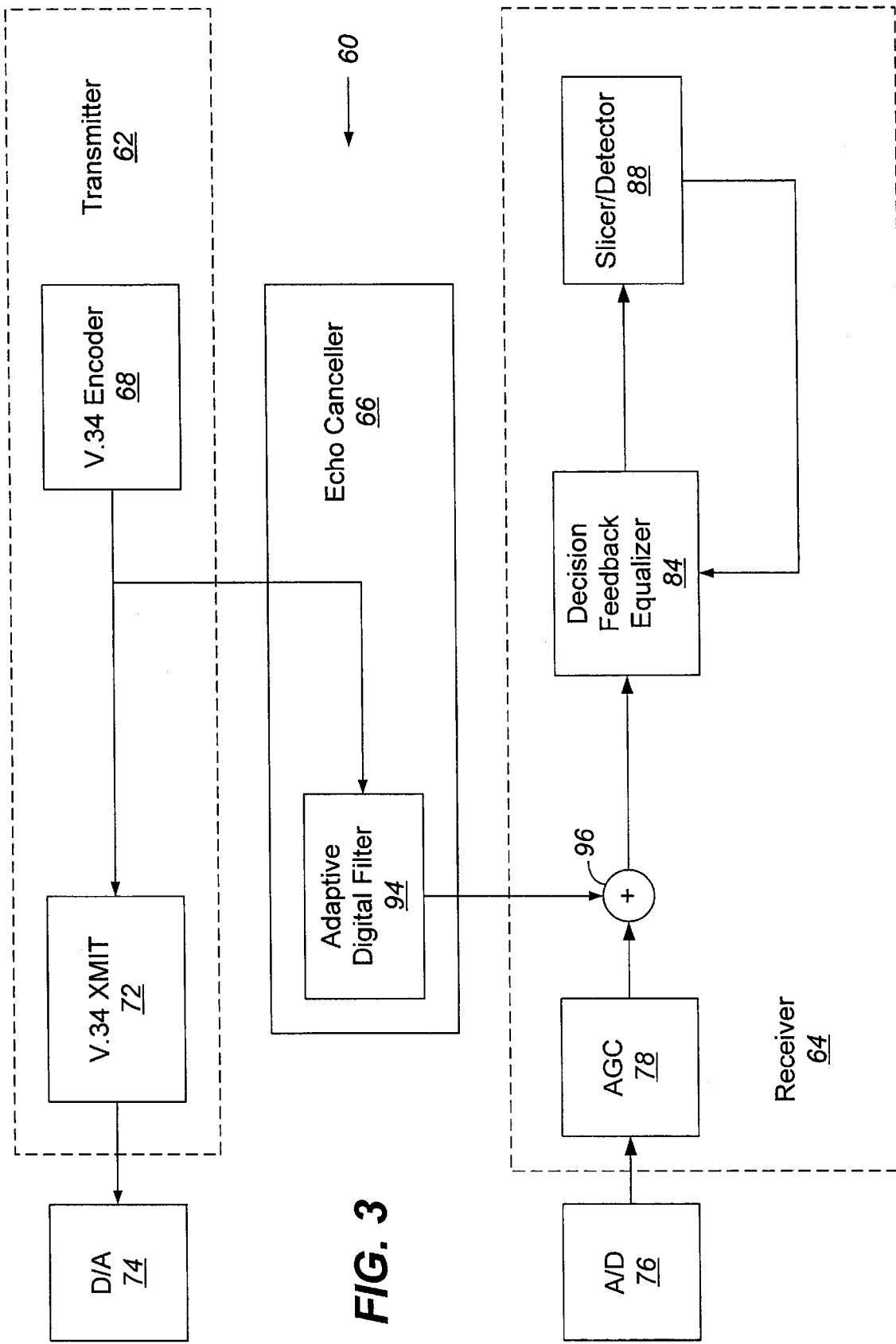
FIG. 3 is a block diagram that illustrates an exemplary V.90 client modem in accordance with the present invention.

A block diagram of a V.90 client modem 60 according to an illustrative embodiment of the present invention is shown in FIG. 3. The V.90 modem 60 includes a V.34 transmitter 62 and a PAM receiver 64, which are coupled together by an echo canceller 66. The transmitter 62 includes a V.34 encoder 68 that encodes the data to be transferred, typically using trellis coding, and then provides the encoded data to a V.34 transmit unit 72. The V.34 transmit unit 72 in conjunction with the D/A converter 74 transmits the encoded data towards the network using, for example, QAM modulation.

The receiver 64 receives a PAM signal from the network through an A/D converter 76. The digital samples from the A/D converter 76 are applied to an automatic gain control (AGC) component 78, which applies the amount of gain that may be needed to compensate for attenuation in the network and/or in the local loop.

Once the digitized signal has been amplified by the AGC component 78, the signal is received by an adaptive fractionally spaced decision feedback equalizer (DFE) 84. After the digitized signal is filtered by the decision feedback equalizer 84, the signal is received by the slicer/detector 88, which converts the digital samples into indices by comparing the digital samples with thresholds that are half-way between indexed reference signal levels comprising the PAM signaling alphabet.

When the V.34 signal transmitted by transmitter 62 is received by the line termination equipment in the central office, portions of this signal may reflect back towards the V.90 client modem 60, thereby creating a disturbing echo signal superimposed on the incoming PAM signals. The echo canceller 66 is used to filter out this echo signal so that it does not interfere with the performance of the receiver 64. More specifically, the echo canceller 66 receives a complex T-spaced symbol stream from the V.34 encoder 68 and produces a real, T/k fractionally spaced symbol stream as an output, where k is an integer number and T refers to the modulation interval, which is generally given by the inverse of the symbol (baud) or sample rate. Selection of the integer k depends on the sampling rate used by the front end of the receiver 64 (i.e., the A/D converter 76 and the AGC 78). The echo canceller 66 in accordance with the present invention comprises an adaptive digital filter 94 that performs both an interpolation function as well as a filtering function. The sampling rate used in the V.34 encoder 68 is typically different from the sampling rate used by the front end of the receiver 64. In a preferred embodiment, the V.34 encoder 68 operates at 3200 samples per second while the digital samples from the AGC 78 are output at 9600 samples per second. Thus, the adaptive digital filter 94 is used to match the sampling rate of the transmitter 62 with the sampling rate of the receiver 64 by interpolating the samples from the V.34 encoder 68 up to the 9600 samples per second rate. To achieve this level of interpolation, k is typically set to three in a preferred embodiment. Note that because the transmitter 62 and the receiver 64 share the same local clock, the, echo canceller 66 need not perform a clock synchronization function in addition to the interpolation.

The adaptive digital filter 94 may be implemented as a finite impulse response (FIR) filter comprising a tapped delay line with associated tap coefficients. The output from the adaptive digital filter 94 is combined with the digitized signal from the AGC 78 in an adder 96. Desirably, the output from the adaptive digital filter 94 should complement the echo signal reflecting back from the local loop to effectively cancel its effect upon the received PAM signal. Because the symbols from the V.34 encoder 68 are generally encoded as complex values when QAM modulation is used, the tap coefficients for the adaptive digital filter 94 are designed to convert from the complex domain to the real domain as the digital samples representing the PAM signals in the receiver 64 are real values. Typically, the tap coefficients for the adaptive digital filter 94 are trained during a startup interval for the V.90 modem 60 in which test signals are transmitted from the transmitter 62 and the coefficients are adjusted until the output from the adder 96 is approximately null.

Figure 4:
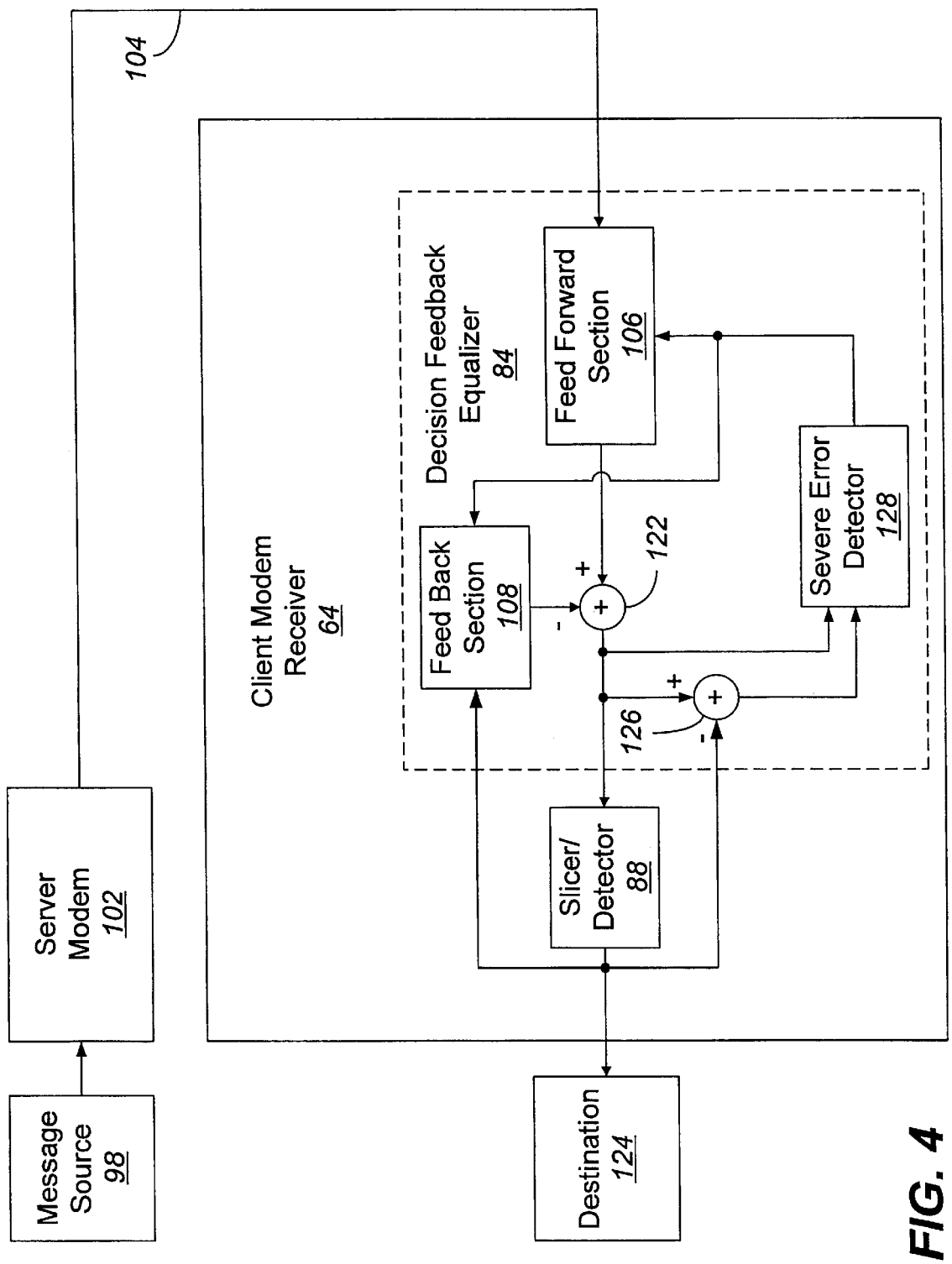
FIG. 4 is a block diagram of a receiver shown in FIG. 3 that illustrates severe error detectors, methods, and computer program products in accordance with the present invention.

With reference now to FIG. 4, a preferred architecture of the receiver 64 will be described in greater detail. Information from a message source 98, such as an ISP, is transmitted via a V.90 server modem 102 through the PSTN 28 until reaching the local loop to which the client modem receiver 64 is connected. The connection through the PSTN 28, including the line card in the central office 32, the local loop, and the front end of the receiver 64 (including the echo cancellation performed by the echo canceller 66 and the adder 96), are represented by the communication path 104 in FIG. 4.

An interpolator (not shown) may be used in conjunction with the decision feedback equalizer 84 to match the sampling rate of the receiver 64 with the sampling rate of the network, which is 8000 samples per second. In a preferred embodiment, the sampling rate used by the A/D converter 76 and the AGC 78 is 9600 samples per second. The decision feedback equalizer 84 comprises a feed forward section 106 and a feed back section 108 and typically provides some level of interpolation or decimation to the sampling rate. For example, in a preferred embodiment of the present invention, the feed forward section 106 receives input samples with a sampling interval of T/q and filters these input samples through use of a tapped delay line having a tap spacing of pT/q. Recall that T corresponds to the modulation interval, which is ⅛₀₀₀ samples per second (i.e., the network sampling rate). The specific choice of values for p and q is generally based on a compromise between computational complexity, storage requirements, and bandwidth availability. In a preferred embodiment, p and q are set to three and four respectively; therefore, the digital samples are interpolated from 9600 samples per second up to 32000 samples per second. Then, once the samples are decimated by the decision feedback equalizer 84, the digital samples are provided to the slicer/detector 88 at the network sampling rate of 8000 samples per second.

Figure 5:
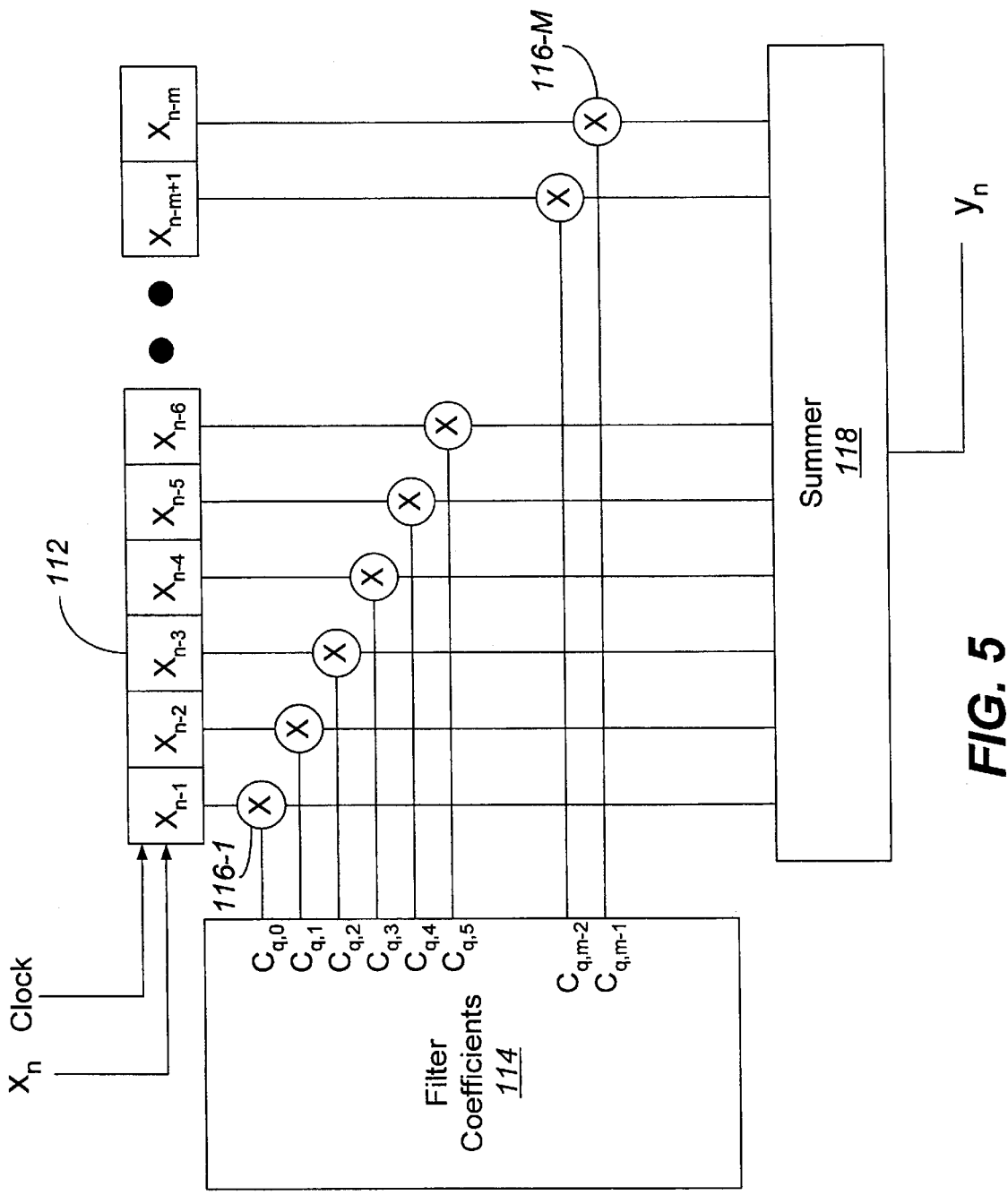
FIG. 5 is a block diagram that illustrates an adaptive digital filter of a type that may be used in an adaptive fractionally spaced decision feedback equalizer and echo canceller shown in FIGS. 3 and 4.

FIG. 5 shows the general structure of an adaptive FIR filter, which is a preferred implementation for the feed forward section 106, the feed back section 108, and the adaptive digital filter 94 (see FIG. 3) used in the echo canceller 66. The operation of an FIR digital filter can generally be represented by Equation 3 set forth below:

$$Y_n = \sum_{k=1}^{k=m} C_k^n X_{n-k} \qquad \text{EQ. 3}$$

where $Y_n$ is the output at time n, $C_k^n$ is the $k^{th}$ coefficient at time n and $X_{n-k}$ is the input at time n-k. Typically, the collection of samples $X_{n-1}$ through $X_{n-m}$ are stored in a tapped delay line 112. The characteristics of the filter are determined by the values of the coefficients 114 at time n. Each coefficient is also called a tap weight or tap coefficient. Each coefficient, $C_k^n$, is used to multiply the respective sample of X(t) through a corresponding multiplier 116-$i$ with the result that $Y_n$ is equal to the sum of the products of the coefficients and the respective m samples of X(t), which is output from a summer 118. This approach of generating output samples $Y_n$ based on a weighted summation of prior-in-time input samples combats the effects of noise, attenuation, and inter-symbol interference (ISI) due to delay and distortion caused by the equivalent channel 104.

Returning to FIG. 4, the feed forward section 106 is used to filter the digital samples to counteract the effects of channel amplitude and phase distortion due to the equivalent channel 104. These filtered samples are then applied to the slicer/detector 88 through an adder 122. The slicer/detector 88 converts the digital samples from the output of the adder 122 to indices by comparing the samples with a PAM signaling alphabet comprising indexed reference signal levels. These indices are decoded into a stream of digital data that correspond to the original data sent from the message source 98. Ultimately, this stream of digital data is provided to the destination 124. The slicer/detector 88 also outputs the reference signal levels corresponding to these indices. This second output of the slicer/detector 88 is provided to the feed back section 108 and an adder 126.

A first feedback loop is formed through the adder 126 for computing an error signal, which is defined as the difference between the received signal at the input of the slicer/detector 88 and the detected signal as determined by the slicer/detector 88. This error signal is used to adapt the coefficients of the feed forward section 106 and the feed back section 108 to the characteristics of the equivalent channel 104. Nevertheless, should a momentary intrusion of noise cause the error signal to sharply increase in magnitude, a severe error detector 128 is used to prevent an undesired disturbance to the coefficients of the feed forward and feed back sections 106, 108. Thus, the severe error detector 128 provides a measure of stability for the decision feedback equalizer 84 under transient high noise conditions.

A second feedback loop is included that couples the output of the slicer/detector 88 through the feed back section 108 to the adder 122. The feed back section 108 is used to further refine the digital samples that are applied to the detector/slicer 88. Specifically, the signal samples input to the feed back section 108 are reference signal levels from the slicer/detector 88 and are thus uncorrupted by noise as long as the slicer/detector 88 is correctly estimating or detecting the transmitted PAM symbols. Therefore, the feed back section 108 is designed primarily to reduce the effects of ISI due to the delay characteristics of the equivalent channel 104.

The receiver structure described hereinabove lends itself to an efficient implementation requiring approximately eighteen million instructions per second (MIPS) in a typical digital signal processor. Moreover, the receiver structure is compatible with existing analog front ends and transmitters designed for the V.34 or other comparable legacy recommendation standards.

V.90 Client Modem Receiver Software Architecture

Figure 6:
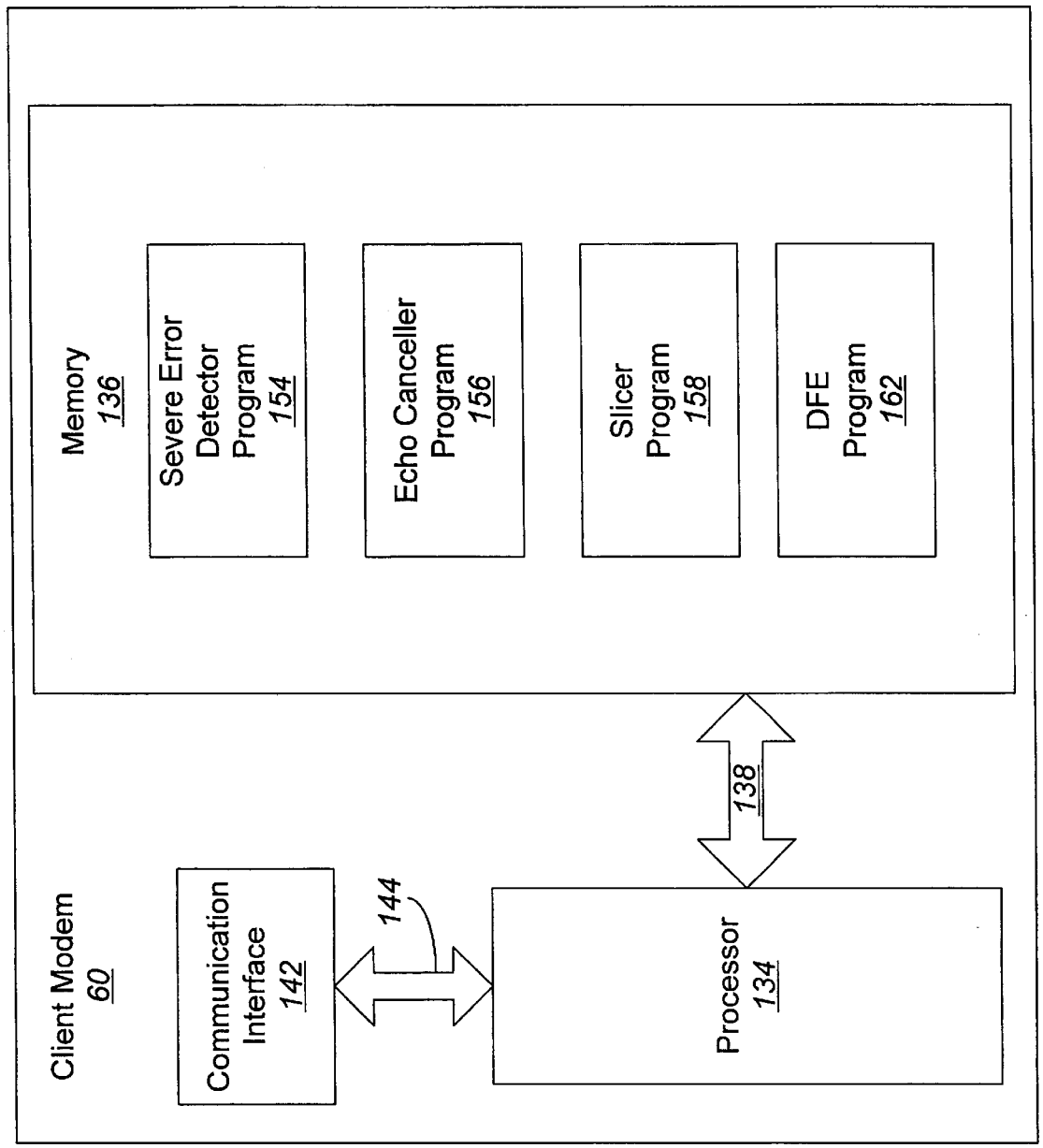
FIG. 6 is a block diagram illustrating a software architecture of a receiver shown in FIG. 4.

Referring now to FIG. 6, a software architecture for the receiver 64 and echo canceller 66 of the V.90 client modem 60 will be described. The client modem 60 includes a processor 134, preferably a digital signal processor, which communicates with a memory 136 via an address/data bus 138. In addition, the processor 134 may receive and transmit information to external devices via a communication interface 142, which is accessed through an input/output (I/O) bus 144. The processor 134 may be any commercially available or custom processor suitable for a real-time intensive embedded application. The memory 136 is representative of the overall hierarchy of memory devices containing the software and data used to implement the functionality of the V.90 client modem 60. The memory 136 may include, but is not limited to, the following types of devices: cache, ROM, PROM, EPROM, EEPROM, flash, SRAM, and DRAM. As shown in FIG. 6, the memory 136 includes program modules for implementing the functionality of the components discussed in the foregoing with reference to FIGS. 3 and 4. That is, the memory 136 includes a severe error detection program module 154, an echo canceller program module 156, a slicer program module 158, and a decision feedback equalizer (DFE) program module 162. Each of these program modules corresponds to a respective component of the V.90 client modem 60 shown in FIGS. 3 and 4.

The present invention is described herein with reference to flowchart and/or block diagram illustrations of methods, apparatus (systems), and computer program products according to an embodiment of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Operations and features provided by the severe error detector program module 154 will be described hereafter with reference to the flow charts of FIGS. 7A and 7B and the architectural diagrams of FIGS. 3, 4, and 6.

Severe Error Detection

Decision feedback equalizers may be used in modem designs because of their ability to provide high signal-to-noise ratios (SNRs). One drawback to this improved SNR performance, however, is the tendency for the equalizer to become unstable. In particular, incorrect decisions by the slicer/detector 88 due to noise may cause two negative effects: A primary effect is that the errors may propagate for many sampling or modulation intervals after they were made because the errors are repeatedly fed back via the feedback loop. A secondary effect is that the tap coefficients for the decision feedback equalizer 84 filters may be pulled away from their desired, steady state, operating points. Moreover, the more dramatic the error, the greater the disturbance to the equalizer coefficients.

Accordingly, the severe error detector 128 under the control of the severe error detector program module 154 may be used to provide stability for the decision feedback equalizer 84 under extreme noise conditions that may cause severe errors in the receiver 64.

The V.90 Recommendation provides for data transmission via data frames. A data frame comprises six data frame intervals with each interval holding a single symbol. Because the data frame intervals may be exposed to different digital impairments, such as different RBS schemes, the V.90 Recommendation allows a unique symbol or signal constellation (i.e., signaling alphabet) to be used in each of the data frame intervals that is designed to have a reduced sensitivity to the digital impairments affecting the particular data frame interval.

Figure 7A:
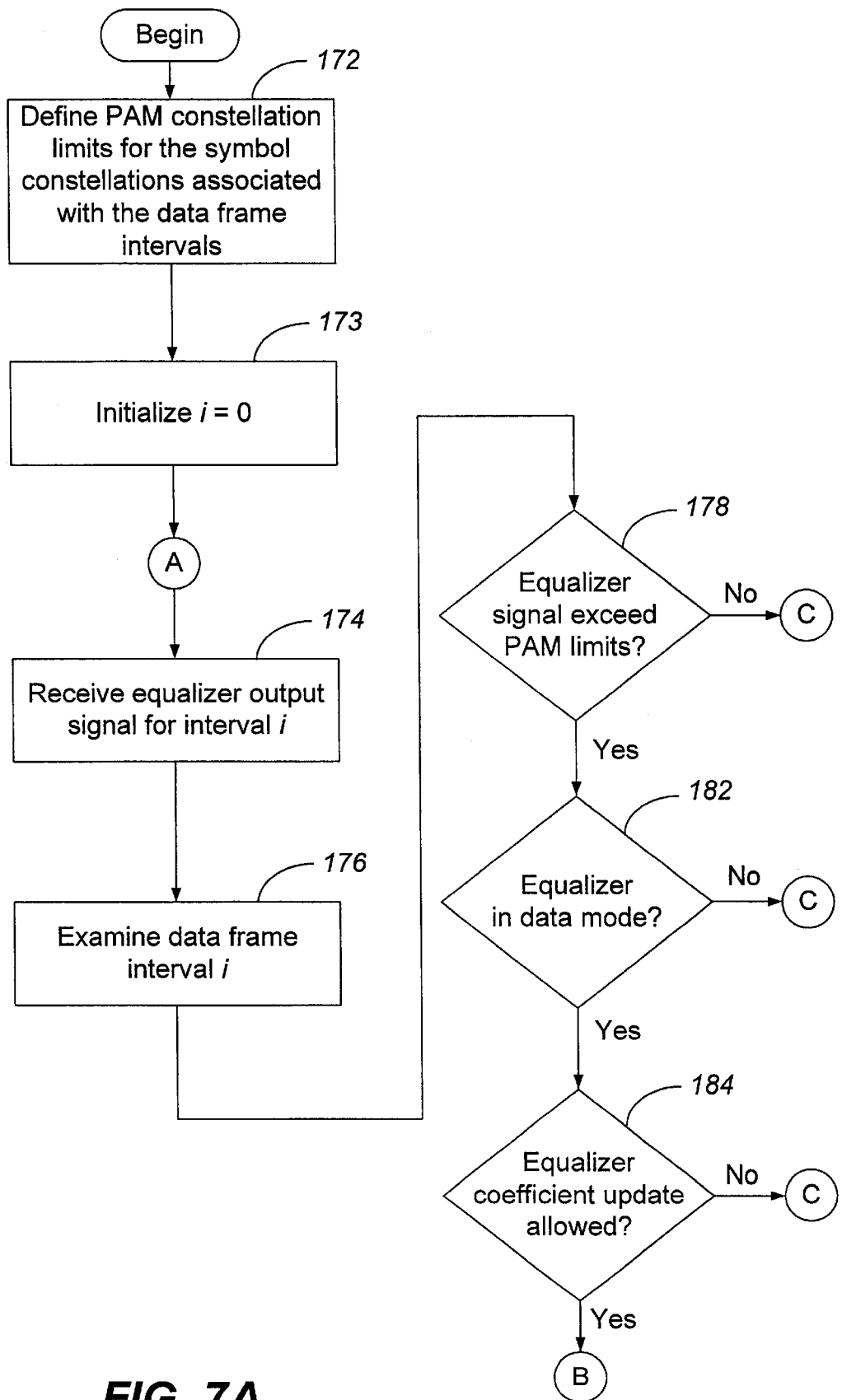
FIGS. 7A–7B are a flow chart that illustrates operations of severe error detectors, methods, and computer program products of FIGS. 3–6 in accordance with the present invention.
Figure 8:
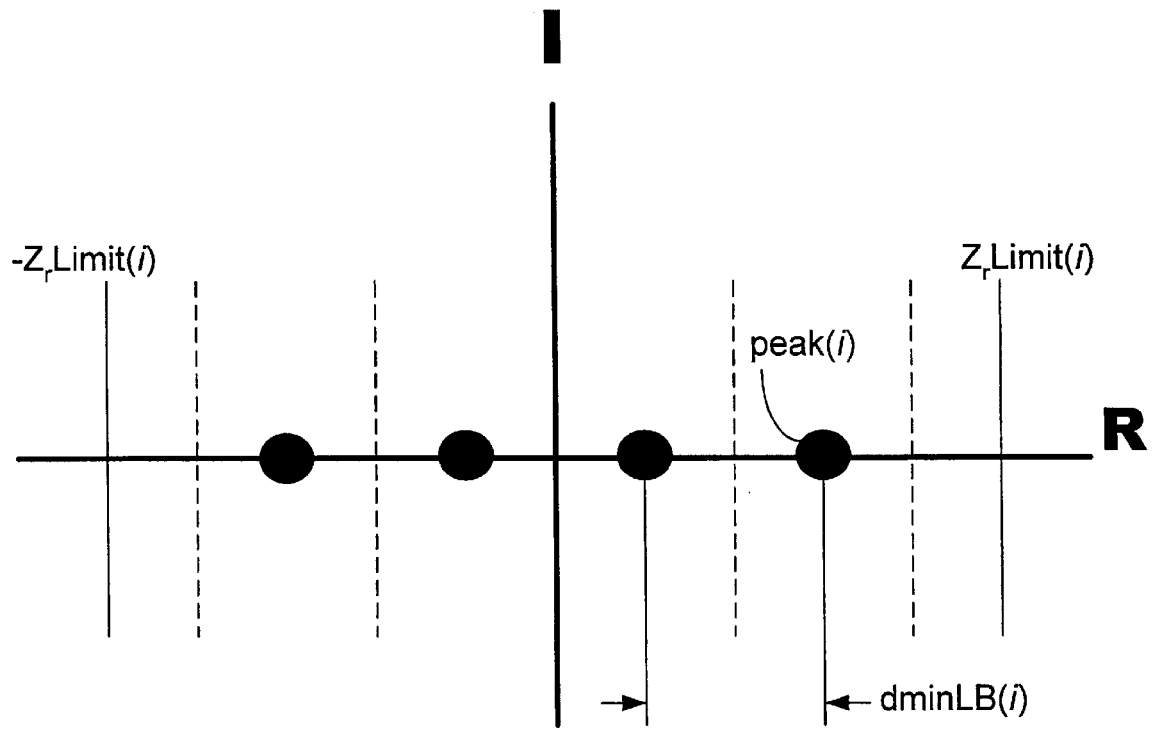
FIG. 8 is a signaling alphabet or constellation point diagram that illustrates constellation thresholds or limits for a severe error as referenced in FIGS. 7A and 7B.

With reference to FIG. 7A, the severe error detection program module 154 defines separate constellation thresholds or maximum limits for valid members of the signaling alphabet (i.e., indexed reference signal levels) or constellation points for the symbol or signal constellations associated with each of the six data frame intervals respectively at block 172. The separate constellation thresholds are typically defined after the symbol constellations have been built. As elements of the constellation are altered (e.g., due to data mode level learning or a data rate renegotiation), however, the constellation thresholds may be updated. This is illustrated best in FIG. 8 where a simplified constellation diagram is shown for one of the six symbol or signal constellations. The symbol or signal constellation of FIG. 8 is assigned to data frame interval i and comprises four ideal reference levels that are defined along the real axis. Note that for PAM signaling, all constellation points fall on the real axis unlike QAM signaling in which the constellation points fall in the various quadrants in two-dimensional space.

The dashed lines in FIG. 8 represent the decision boundaries used by the slicer/detector 88 in correlating the digital sample from the decision feedback equalizer 84 with a particular constellation point and ultimately a PCM codeword. The two outer boundaries, $Z_r Limit(i)$ and $-Z_r Limit(i)$, correspond to the outermost points or signal levels in the symbol or signal constellation (i.e., constellation points or signal levels having the maximum magnitude) plus margin (i) (minus margin(i) for $-Z_r Limit(i)$), which is related to the difference or spacing between adjacent symbols in the symbol constellation identified by the index variable i. In a preferred embodiment, margin(i) corresponds to the value dminLB(i), which represents the smallest possible spacing between any two adjacent constellation points or signal levels in the symbol or signal constellation. The value dminLB(i) may be multiplied by a scaling factor K to "tune" $Z_r Limit(i)$ and $-Z_r Limit(i)$ for a particular decision feedback equalizer structure. In a preferred embodiment of the present invention, K is set to one. These two boundaries—$Z_r Limit(i)$ and $-Z_r Limit(i)$—provide the constellation thresholds or maximum limits for a valid PAM signal used in data frame interval i. It should be understood that, in general, dminLB (i) would not correspond to the distance between the two outermost points in a PCM/PAM symbol constellation. In fact, dminLB(i) may be considerably smaller than the distance between the two outermost constellation points because the spacing between PCM symbols proceeds along a logarithmic curve.

Returning to FIG. 7A, only the positive constellation thresholds $Z_r Limit(i)$, $0 \leq i \leq 5$, for the six data frame intervals need be defined at block 172 because, in V.90, the constellation points in a symbol or signal constellation fall symmetrically along the real axis as shown in FIG. 8. An index variable i for the six data frame intervals is initialized to zero at block 173. Next, at block 174, the severe error detector 128 receives the decision feedback equalizer 84 output signal from the adder 122 and, at block 176, data frame interval i is examined. Three determinations are then made, in no particular order, as represented by blocks 178, 182, and 184. At block 178, a determination is made whether the output signal sample from the decision feedback equalizer 84 corresponding to the data frame interval i exceeds the constellation threshold, $Z_r Limit(i)$ from block 172 by comparing the absolute value of the output signal sample with the constellation threshold $Z_r Limit(i)$. A second determination is made at block 182 whether the decision feedback equalizer is in a data transmission mode. Finally, a determination is made at block 184 whether a flag is set that allows the tap coefficients of the decision feedback equalizer 84 to be updated. If the result of any of these three determinations is no, then the process continues by following connector C to block 186 in FIG. 7B. Otherwise, the process continues by following connector B to block 188 in FIG. 7B.

If connector B is followed, then the absolute value of the output signal sample from the decision feedback equalizer 84 exceeds the constellation threshold $Z_r Limit(i)$ from block 172, and a severe error has been recognized at block 178. Moreover, the decision feedback equalizer 84 is in a data reception mode and updating of the tap coefficients for the decision feedback equalizer 84 is allowed. Accordingly, a severe error counter (sev_err_ctr) is incremented by a constant value (sev_err) at block 188. A determination is made at block 192 whether an upper severe error event threshold value (sev_err_thresh) has been exceeded. That is, have enough severe error events accumulated to justify taking action to stabilize the decision feedback equalizer 84. If the severe error counter (sev_err_ctr) has not exceeded the upper severe error event threshold value (sev_err_thresh), then the index variable i is incremented by one using a modulus of six at block 193. Connector A is then followed to FIG. 7A where the severe error detection operations repeat for the next data frame interval at block 174 as discussed in the foregoing. It should be understood that severe error detection operations may continue until the communication session between the client modem 60 and a server modem is terminated.

If, on the other hand, the severe error count has exceeded the threshold value, then error recovery is optionally invoked at block 194 to allow the receiver 64 to drop down to a lower data rate. In addition, the tap coefficients for the decision feedback equalizer 84 are frozen at their current values at block 196 to prevent them from being radically changed due to the out of range PAM samples being received at the slicer/detector 88. Freezing the coefficients at block 196 by setting a flag to the appropriate logic value ensures that future determinations at block 184 (FIG. 7A) are "No," as there would be no need to manipulate the severe error counter (sev_err_ctr) while the coefficients are frozen.

Conversely, if connector C is followed, then the output signal sample from the decision feedback equalizer 84 is within the range of valid constellation points (i.e., a severe error has not been recognized at block 178), the decision feedback equalizer 84 is not in a data transmission mode, or the decision feedback equalizer 84 coefficients are currently frozen. For these cases, the severe error counter (sev_err_ctr) is decremented by a constant value (no_err) at block 186. A defensive check is made at block 198 to determine whether the severe error counter (sev_err_ctr) has fallen below a lower severe error event threshold, which is zero in a preferred embodiment of the present invention, so that the counter can be reset to zero at block 202 should that occur. Once the defensive check for the severe error counter (sev_err_ctr) carried out at blocks 198 and 202 is complete, then a determination is made at block 204 whether the error recovery procedure, which may involve a data rate reductio and/or freezing the equalizer coefficients for a period of time, is complete. If the error recovery procedure has completed, then the error recovery flag set at block 196 is cleared at block 206. The index variable i is incremented by one using a modulus of six at block 193. Connector A is then followed to FIG. 7A where the severe error detection operations repeat for the next data frame interval at block 174 as discussed in the foregoing.

In an alternative embodiment, if a severe error has been recognized at block 178 and updating the tap coefficients is not allowed (i.e., error recovery flag has been set at block 196), then rather than proceeding to block 186 to decrement the severe error counter (sev_err_ctr), operations continue instead at block 204 to determine whether error recovery is complete. Accordingly, the severe error counter is not decremented if severe errors are still being incurred while error recovery is in progress. Note that in this case, the order of the operations represented by blocks 178, 182, and 184 becomes relevant as operations for block 184 should be performed last.

Figure 7B:
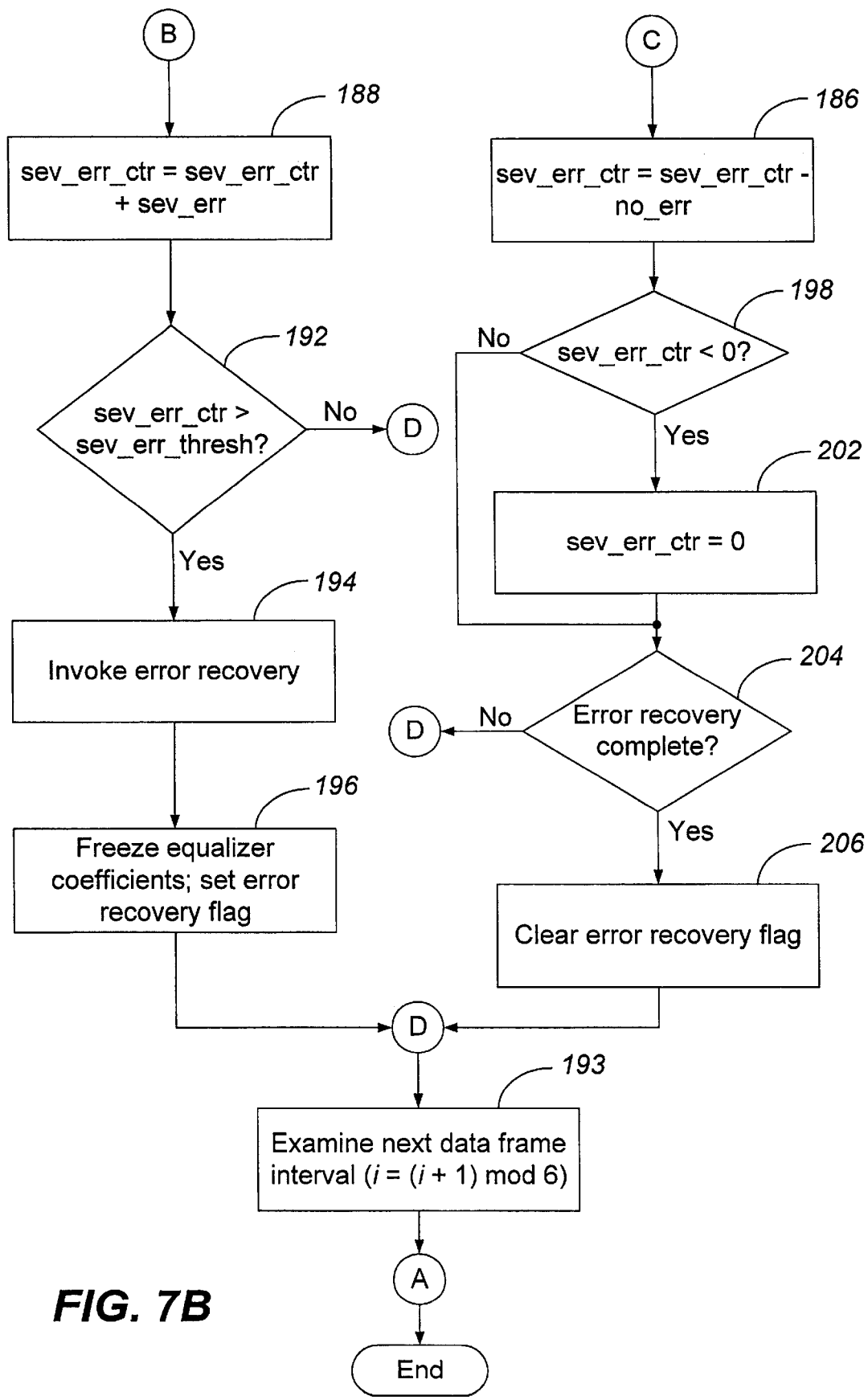

In another alternative embodiment, the sever error counter (sev_err_ctr) may be a negative counter such that the severe error counter (sev_err_ctr) is decremented at block 188 and incremented at block 186 of FIG. 7B. Accordingly, the severe error event threshold value (sev_err_thresh) should a negative number and the logic used for the operations at blocks 192 and 198 should be reversed. That is, a determination should be made at block 192 whether the severe error counter (sev_err_ctr) is less than the severe error event threshold value (sev_err_thresh) and a determination should be made at block 198 whether the severe error counter (sev_err_ctr) is greater than zero.

The severe error detector program module 154 implements a "leaky bucket" in that as severe errors are detected or recognized, a counter is incremented according to a first time constant (i.e., the sev_err value). And when valid PAM samples are detected or the decision feedback equalizer 84 is in a mode in which errors are ignored, the counter is decremented according to a second time constant (i.e., the no_err value). The first and second time constants and the upper severe error event threshold value (sev_err_thresh) used at block 192 are chosen to provide suitable sensitivity to severe errors without thrusting the receiver 64 into error recovery or freezing the tap coefficients too frequently. In a preferred embodiment, the first time constant (sev_err) is set to 50 and the second time constant (no_err) is set to one. The first time constant (sev_err) may be set heuristically based on the level of memory desired in the severe error detector 128 circuit that is detecting severe error events. Preferably, the upper severe error event threshold (sev_err_thresh) is set to 200 for channels that have relatively little passband distortion, and is set to 150 for channels with more passband distortion.

The severe error detector 128 and severe error detector program 154 according to the present invention may be particularly useful in certain countries that use metering pulses in their central offices to facilitate call billing. These pulses are typically sent out every 30 to 40 seconds, which may cause a sufficient disturbance to create severe errors for the decision feedback equalizer 84.

It should also be understood that while the severe error detector 128 is described herein in the context of a V.90 modem receiver, the principles are applicable, in general, to any decision feedback equalizer arrangement whether in a modem receiver or other digital signal processing system.

The flow charts of FIGS. 7A and 7B illustrate the architecture, functionality, and operation of a possible implementation of the client modem receiver 64 software. In this regard, each block represents a module, segment, or portion of code, which comprises one or more executable instructions for implementing the specified logical function (s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

While the present invention has been illustrated and described in detail in the drawings and foregoing description, it is understood that the embodiments shown are merely exemplary. Moreover, it is understood that many variations and modifications can be made to the embodiments described hereinabove without substantially departing from the principles of the present invention. All such variations and modifications are intended to be included herein within the scope of the present invention, as set forth in the following claims.

We claim:

1. A severe error detector, comprising:

means for defining a plurality of constellation thresholds that correspond to a plurality of symbol constellations;

means for receiving an output signal sample that is associated with one of the plurality of symbol constellations, the means for receiving comprising a decision feedback equalizer which comprises a digital filter characterized by a set of coefficients;

means for comparing an absolute value of the output signal sample with the constellation threshold that corresponds with the symbol constellation associated with the output signal sample;

means, responsive to the means for comparing, for recognizing a severe error only if the absolute value of the output signal sample exceeds the constellation threshold that corresponds with the symbol constellation associated with the output signal sample;

means for determining if a number of severe error occurrences exceeds a first error event threshold; and means, responsive to the means for determining, for preventing the coefficients from being updated to new values if the number of severe error occurrences exceeds the first error event threshold.

2. A severe error detector as recited in claim 1, wherein the means for determining comprises:

means, responsive to the means for recognizing, for incrementing an error counter by a first constant if a severe error has been recognized; and means for comparing the error counter with the first error event threshold.

3. A severe error detector as recited in claim 2, further comprising:

means, responsive to the means for recognizing, for decrementing the error counter by a second constant if a severe error has not been recognized;

means for comparing the error counter with a second error event threshold; and means, responsive to the means for comparing the error counter with the second error event threshold, for setting the error counter equal to the second error event threshold if the second error event threshold exceeds the error counter.

4. A severe error detector as recited in claim 1, wherein the means for determining comprises:

means, responsive to the means for recognizing, for decrementing an error counter by a first constant if a severe error has been recognized; and means for comparing the error counter with the first error event threshold.

5. A severe error detector as recited in claim 4, further comprising:

means, responsive to the means for recognizing, for incrementing the error counter by a second constant if a severe error has not been recognized;

means for comparing the error counter with a second error event threshold; and means, responsive to the means for comparing the error counter with the second error event threshold, for setting the error counter equal to the second error event threshold if the error counter exceeds the second error event threshold.

6. A severe error detector as recited in claim 1, further comprising:

means, responsive to the means for determining, for invoking an error recovery protocol if the number of severe error occurrences exceeds the first error event threshold.

7. A method of detecting severe error events, comprising the steps of:

defining a plurality of constellation thresholds that correspond to a plurality of symbol constellations;

receiving an output signal sample that is associated with one of the plurality of symbol constellations from a decision feedback equalizer, the decision feedback equalizer comprising a digital filter characterized by a set of coefficients;

comparing an absolute value of the output signal sample with the constellation threshold that corresponds with the symbol constellation associated with the output signal sample;

recognizing a severe error only if the absolute value of the output signal sample exceeds the constellation threshold that corresponds with the symbol constellation associated with the output signal sample;

determining if a number of severe error occurrences exceeds a first error event threshold; and preventing the coefficients from being updated to new values if the number of severe error occurrences exceeds the first error event threshold.

8. A method as recited in claim 7, wherein the determining step comprises the steps of:

incrementing an error counter by a first constant if a severe error has been recognized; and comparing the error counter with the first error event threshold.

9. A method as recited in claim 8, further comprising the steps of:

decrementing the error counter by a second constant if a severe error has not been recognized;

comparing the error counter with a second error event threshold; and setting the error counter equal to the second error event threshold if the second error event threshold exceeds the error counter.

10. A method as recited in claim 7, wherein the determining step comprises the steps of:

decrementing an error counter by a first constant if a severe error has been recognized; and comparing the error counter with the first error event threshold.

11. A method as recited in claim 10, further comprising the steps of:

incrementing the error counter by a second constant if a severe error has not been recognized;

comparing the error counter with a second error event threshold; and setting the error counter equal to the second error event threshold if the error counter exceeds second error event threshold.

12. A method as recited in claim 7, further comprising the step of:

invoking an error recovery protocol if the number of severe error occurrences exceeds the first error event threshold.

13. A computer program product for detecting severe error events, comprising:

a computer readable storage medium having computer readable program code embodied therein, the computer readable program code comprising:

computer readable program code for defining a plurality of constellation thresholds that correspond to a plurality of symbol constellations;

computer readable program code for receiving the output signal sample that is associated with one of the plurality of symbol constellations from a decision feedback equalizer, the decision feedback equalizer comprising a digital filter characterized by a set of coefficients;

computer readable program code for comparing an absolute value of the output signal sample with the constellation threshold that corresponds with the symbol constellation associated with the output signal sample;

computer readable program code, responsive to the computer readable program code for comparing, for recognizing a severe error only if the absolute value of the output signal sample exceeds the constellation threshold that corresponds with the symbol constellation associated with the output signal sample;

computer readable program code for determining if a number of severe error occurrences exceeds a first error event threshold; and computer readable program code, responsive to the computer readable program code for determining, for preventing the coefficients from being updated to new values if the number of severe error occurrences exceeds the first error event threshold.

14. A computer program product as recited in claim 13, wherein the computer readable program code for determining comprises:

computer readable program code, responsive to the computer readable program code for recognizing, for incrementing an error counter by a first constant if a severe error has been recognized; and computer readable program code for comparing the error counter with the first error event threshold.

15. A computer program product as recited in claim 14, further comprising:

computer readable program code, responsive to the computer readable program code for recognizing, for decrementing the error counter by a second constant if a severe error has not been recognized;

computer readable program code for comparing the error counter with a second error event threshold; and computer readable program code, responsive to the computer readable program code for comparing the error counter with the second error event threshold, for setting the error counter equal to the second error event threshold if the second error event threshold exceeds the error counter.

16. A computer program product as recited in claim 13, wherein the computer readable program code for determining comprises:

computer readable program code, responsive to the computer readable program code for recognizing, for decrementing an error counter by a first constant if a severe error has been recognized; and computer readable program code for comparing the error counter with the first error event threshold.

17. A computer program product as recited in claim 16, further comprising:

computer readable program code, responsive to the computer readable program code for recognizing, for incrementing the error counter by a second constant if a severe error has not been recognized;

computer readable program code for comparing the error counter with a second error event threshold; and computer readable program code, responsive to the computer readable program code for comparing the error counter with the second error event threshold, for setting the error counter equal to the second error event threshold if the error counter exceeds the second error event threshold.

18. A computer program product as recited in claim 13, further comprising:

computer readable program code, responsive to the computer readable program code for determining, for invoking an error recovery protocol if the number of severe error occurrences exceeds the first error event threshold.

19. A severe error detector, comprising:

means for defining a plurality of constellation thresholds that correspond to a plurality of symbol constellations;

a decision feedback equalizer that is configured to receive an output signal sample that is associated with one of the plurality of symbol constellations, the decision feedback equalizer comprising a digital filter characterized by a set of coefficients;

means for comparing an absolute value of the output signal sample with the constellation threshold that corresponds with the symbol constellation associated with the output signal sample;

means, responsive to the means for comparing, for recognizing a severe error if the absolute value of the output signal sample exceeds the constellation threshold that corresponds with the symbol constellation associated with the output signal sample;

means for determining if a number of severe error occurrences exceeds an error event threshold; and means, responsive to the means for determining, for preventing the coefficients from being updated to new values if the number of severe error occurrences exceeds the error event threshold.

20. A method of detecting severe error events, comprising the steps of:

defining a plurality of constellation thresholds that correspond to a plurality of symbol constellations;

receiving an output signal sample that is associated with one of the plurality of symbol constellations from a decision feedback equalizer, the decision feedback equalizer comprising a digital filter characterized by a set of coefficients;

comparing an absolute value of the output signal sample with the constellation threshold that corresponds with the symbol constellation associated with the output signal sample;

recognizing a severe error if the absolute value of the output signal sample exceeds the constellation threshold that corresponds with the symbol constellation associated with the output signal sample;

determining if a number of severe error occurrences exceeds an error event threshold; and preventing the coefficients from being updated to new values if the number of severe error occurrences exceeds the error event threshold.

21. A computer program product for detecting severe error events, comprising:

a computer readable storage medium having computer readable program code embodied therein, the computer readable program code comprising:

computer readable program code for defining a plurality of constellation thresholds that correspond to a plurality of symbol constellations;

computer readable program code for receiving an output signal sample that is associated with one of the plurality of symbol constellations from a decision feedback equalizer, the decision feedback equalizer comprising a digital filter characterized by a set of coefficients;

computer readable program code for comparing an absolute value of the output signal sample with the constellation threshold that corresponds with the symbol constellation associated with the output signal sample;

computer readable program code, responsive to the computer readable program code for comparing, for recognizing a severe error if the absolute value of the output signal sample exceeds the constellation threshold that corresponds with the symbol constellation associated with the output signal sample;

computer readable program code for determining if a number of severe error occurrences exceeds an error event threshold; and computer readable program code, responsive to the computer readable program code for determining, for preventing the coefficients from being updated to new values if the number of severe error occurrences exceeds the error event threshold.

* * * * *